(12) United States Patent
Kuhns

(10) Patent No.: US 12,522,380 B2
(45) Date of Patent: Jan. 13, 2026

(54) LANDING PAD AND IN-FLIGHT METHODS OF MANUFACTURING A LANDING PAD

(71) Applicant: Masten Space Systems, Inc., Mojave, CA (US)

(72) Inventor: Matthew Kuhns, Mojave, CA (US)

(73) Assignee: ASTROBOTIC TECHNOLOGY, INC., Pittsburgh, PA (US)

( * ) Notice: Subject to any disclaimer, the term of this patent is extended or adjusted under 35 U.S.C. 154(b) by 731 days.

(21) Appl. No.: 17/823,671

(22) Filed: Aug. 31, 2022

(65) Prior Publication Data

US 2022/0411111 A1 Dec. 29, 2022

Related U.S. Application Data

(63) Continuation of application No. 17/224,119, filed on Apr. 6, 2021, now Pat. No. 11,459,132.

(51) Int. Cl.

| | |
|---|---|
| *B64G 1/40* | (2006.01) |
| *B64G 1/62* | (2006.01) |
| *B64G 99/00* | (2009.01) |
| *C23C 4/10* | (2016.01) |
| *C23C 4/12* | (2016.01) |
| *E01C 9/00* | (2006.01) |
| *E01C 19/17* | (2006.01) |

(52) U.S. Cl.
CPC ............... *B64G 1/40* (2013.01); *B64G 1/625* (2023.08); *B64G 99/00* (2022.08); *C23C 4/10* (2013.01); *C23C 4/12* (2013.01); *E01C 9/008* (2013.01); *E01C 19/17* (2013.01)

(58) Field of Classification Search
CPC .... B64G 1/40; B64G 1/42; B64G 1/66; B29C 64/00; B05B 5/032; B05B 5/1683; B05B 7/1436; B05B 7/205; B05B 11/045
See application file for complete search history.

(56) References Cited

U.S. PATENT DOCUMENTS

| | | |
|---|---|---|
| 3,472,471 A | 10/1969 | Badewitz |
| 8,744,126 B1 | 6/2014 | Rohrschneider |
| 2015/0231826 A1 | 8/2015 | Snyder et al. |

*Primary Examiner* — Timothy D Collins
*Assistant Examiner* — Eric Acosta
(74) *Attorney, Agent, or Firm* — Silver Legal LLC; Jarrett L. Silver

(57) ABSTRACT

Described herein is a method of constructing a landing pad using a rocket engine while in-flight. Among other benefits, this method can reduce ejecta that otherwise would occur during landing on an unimproved surface. While a spacecraft is hovering over an unimproved surface, the spacecraft can inject particles into its rocket engine, after which the particles absorb heat from the engine and are projected at ballistic speeds toward the unimproved surface to create a landing pad. After constructing the landing pad and waiting for the landing pad to cool, the spacecraft can land on the landing pad. Also described herein are landing pads created from such particles as they impact the surface in a disc splat mode into the unimproved surface.

6 Claims, 15 Drawing Sheets

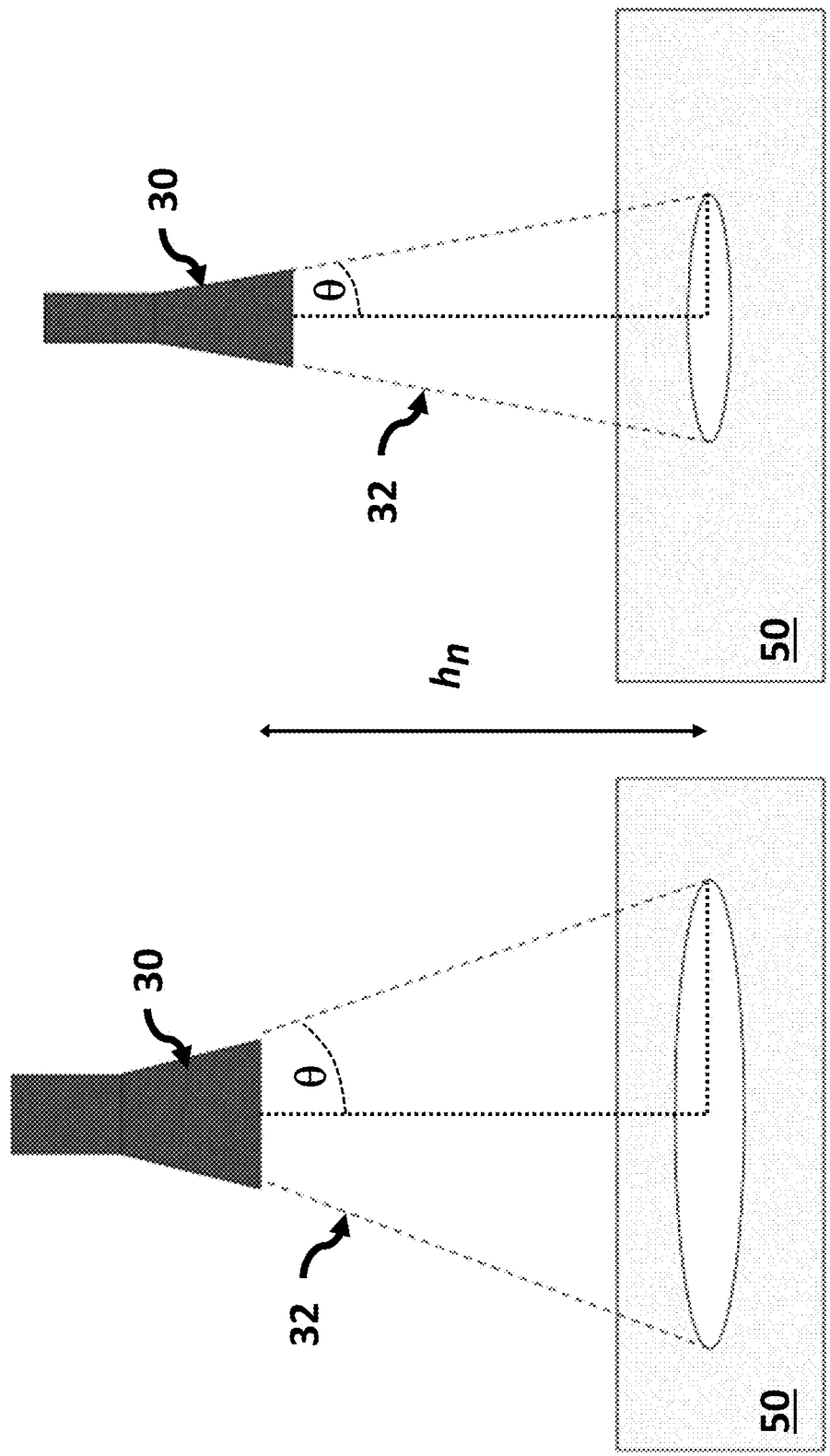

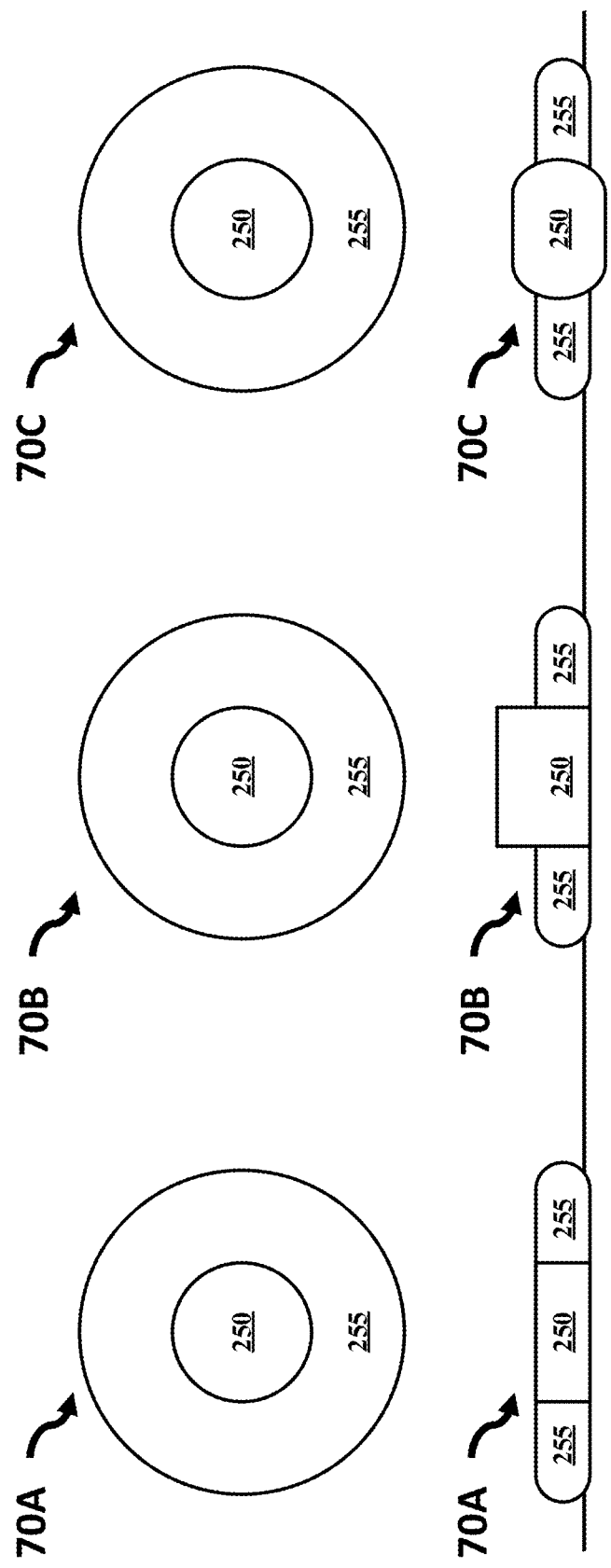

LANDING PAD AND IN-FLIGHT METHODS OF MANUFACTURING A LANDING PAD

CROSS-REFERENCE TO RELATED APPLICATION

This application is a continuation of U.S. patent application Ser. No. 17/224,119, filed Apr. 6, 2021, which is incorporated by reference herein in its entirety.

BACKGROUND

Technical Field

The present application relates to manufacturing coatings on unimproved surfaces using a rocket engine.

Description of Related Art

Landing a spacecraft on a dusty, unimproved surface made of soil and rocks ("regolith") of the Earth's moon, Mars, an asteroid or elsewhere can be difficult as the gas from the spacecraft's engine plume creates a dangerous blast of ejecta. Ejecta is the material dislocated from the surface by the plume including soil, regolith, rocks, and dust. Not only does the gas plume create the ejecta, but it also craters through the regolith surface, further creating additional ejecta and blasting the landing vehicle. The plume of a large spacecraft can even send lunar regolith into lunar orbit. This puts orbiting vehicles in danger, with projections reaching 10,000 impacts per square meter of surface area when the ejecta crosses orbital paths. The ejecta, moving at up to 6,000 meters per second differential velocity to the spacecraft would cause tremendous damage.

Ideally, a spacecraft would land on a pre-constructed landing pad. However, in order to construct a landing pad on a moon or a foreign surface, there are issues of safely getting the manufacturing equipment and materials to the surface in the first place in order to construct the landing pad and then bringing or mining materials to use. Using existing technologies, the cost to construct this type of landing pad would likely exceed 120 million US dollars on the Moon and stretch into the billions of dollars for Mars.

The alternative has been to build a spacecraft that can hopefully survive a landing on an unimproved surface. Damage from the ejecta in this scenario is probable, if not inevitable. An example of this type of damage has already been observed on the Moon, when the Apollo 12 lunar module landed adjacent to the Surveyor 3 lander, which was sand blasted by the resulting 3,000 m/s ejecta from Apollo 12. As an example of damage on Mars, a weather instrument on the Curiosity rover was damaged on landing, likely from rocks and debris blown up onto the deck from the landing rockets.

SUMMARY

With vertical landing vertical takeoff (VTVL) spacecraft, jets, and the like, downward facing engines and their plumes can create dust storms in the absence of a landing pad as well as huge cratering and spalling on failed landing pads. Applicant has developed a safer, cheaper, and more efficient way than dealing with the problems listed above through in-flight landing pad construction, enabling safer space travel to unimproved surfaces. Described herein are novel landing pads, methods of constructing a landing pad, and methods of landing on them. This invention eliminates the need for an existing landing pad to be in place for a spacecraft to land because the spacecraft can manufacture its own landing pad just prior to landing.

Described herein is a first example method of manufacturing a landing pad from a spacecraft in flight. The method includes the steps of flying a spacecraft including a rocket engine over an unimproved surface; combusting propellant in the rocket engine to create a plume directed at a landing pad construction site on the unimproved surface; and injecting landing pad construction particles into the rocket engine that are propelled toward the landing pad construction site. The injecting step is continued until a landing pad is formed of successive layers of the landing pad construction particles binding to the landing pad construction site or a layer of previously deposited landing pad construction particles.

Additionally, the method may include a step of landing the spacecraft on the landing pad.

Additionally or alternatively, the method may include steps of storing landing pad threshold data in a non-transient computer-readable storage medium on the spacecraft; sensing the landing pad or the environment with a sensor; reading sensor data from the sensor by a controller; determining with the controller whether the sensor data meets the landing pad threshold data; sending with the controller a signal indicating that the sensor data suggests landing the spacecraft on the landing pad is safe or writing by the controller to the storage medium a flag indicating that the sensor data suggests landing the spacecraft on the landing pad is safe; and, upon receiving the signal or reading the flag, initiating with a second controller a landing sequence to land the spacecraft onto the landing pad. Examples of sensors include LiDAR in the form of scanning or flash LiDAR or a thermal camera.

Additionally or alternatively, the method may include the steps of storing baseline data previously sensed from the sensor; determining with the controller a difference between the sensor data and the baseline data; and writing by the controller to the storage medium the difference in the storage medium or sending by the controller a signal with the difference; and, upon receiving the signal indicating that the sensor data suggests landing the spacecraft on the landing pad is safe and the signal indicating the difference or reading the flag and the difference, initiating with the second controller the landing sequence to land the spacecraft onto the landing pad.

The step of reading sensor data may include sensing an altitude of the spacecraft with an altimeter and sensing with a thermal sensor a temperature below the space craft. The step of determining may include correlating the altitude with the sensed temperature and comparing the correlation to the landing pad threshold data. Optionally, the method may include a step of waiting for the landing pad to cool prior to the step of landing and/or initiating the landing sequence.

Additionally or alternatively, the sensed temperature may be a splash temperature of the plume.

Additionally or alternatively, the landing pad thickness can be calculated from deposition altitude, injection rate and the rocket engine conditions. The cooling time can then be determined for the landing pad thickness to sufficiently cool. A timer can be used to wait for the cooling time, after which a controller can initiate a landing sequence to land the spacecraft onto the landing pad.

Additionally or alternatively, the step of reading censored data includes sensing reflectance of the landing pad using an optical sensor. The step of determining includes confirming the reflectance matches the landing pad threshold data storing landing from reflectance information and correlating the sensor data to a position of the spacecraft relative to the landing pad. Additionally or alternatively, reflective additives can be injected together with the landing pad construction particles. Then the reflectance of the landing pad is measured with an optical sensor. And the sensor data can be used to determine the amount of buildup relative to a baseline data of a prior reflectance reading.

Additionally or alternatively, the step of reading sensor data can include sensing the topography of the landing pad using the LiDAR or RADAR. Then, the step of determining can include correlating the topography with the baseline data storing in earlier topography scan and comparing the correlation to the landing pad threshold data.

Additionally or alternatively, hardness or strength can be sensed using a thermal camera, and then it can be confirmed that the hardness or strength exceeds the landing pad threshold data storing safe-level hardness or strength information for a weight of the spacecraft.

A wide variety of sensors can be used within the scope of this invention. Some example sensors include scanning lidar, a flash lidar, a thermal camera, or inertial measurement unit.

In some embodiments, the step of injecting creates a thicker or denser region in a plume impingement region of the landing pad configured to resist a hole punched through the landing pad by a plume of a spacecraft. In another example embodiment, the sensor is an inertial measurement unit, and the step of injecting injects a higher volume of landing pad construction particles when the sensor senses lateral wind. Additionally or alternatively, the step of injecting the landing pad construction particles is performed sequentially to optimize a cooling rate of individual layers of the landing pad and minimize an overall cooling rate of the landing pad.

Additionally or alternatively, the plume is kept small enough or an altitude of the spacecraft is kept high enough to prevent ejecta from the unimproved surface until at least a first layer of the landing pad has been sintered together.

Also described are landing pads created by the methods herein.

Additionally or alternatively to the methods described herein, individually or collectively they can be controlled and performed by an onboard computer on a spacecraft using its controller and storing instructions on a computer-readable storage medium. Additionally, their various steps can be implemented into machine learning models for training or output.

Several of the example embodiments herein make use of the disc splat mode of binding successive layers of the landing pad construction particles to the landing pad construction site. To achieve this, some of the methods herein control the particle velocity and the particle temperature upon exiting the rocket engine to create this disk splat mode. The resulting landing pad has a unique microstructure consisting of disc splats across several layers of the landing pad.

Several of the example embodiments make use of different types of landing pad construction particles. In some embodiments, the landing pad construction particles are metal, cermets or ceramic or a mixture thereof and absorb enough heat from the rocket engine or the plume to at least partially melt. One example material used is alumina. Another example particle includes a ceramic core and a metal exterior layer.

In some embodiments, the unimproved surface is at least one of a regolith, rocky or icy surface of a moon, comet, asteroid or planet. In some embodiments, the method steps are conducted when the amount of light or shadow on the unimproved surface is consistent across the landing pad construction site to improve the consistency of the landing pad.

This application discusses different regimes of the amount of heat applied to landing pad construction particles. In some embodiments landing pad construction particles are above the liquidus line (warmer) and in some embodiments they are below the liquidus line (colder). in order to apply more heat, the particles can be injected more upstream in the rocket engine, for example, near the injector or summer upstream of the throat. To apply less heat particles can be injected at the throat. And to apply even less heat, the particles can be injected at the nozzle. Additional ways to control the heat are to adjust the throttle of the engine.

A different example method of in-flight sensing of a rocket engine deployed landing pad using an onboard computer including a controller and a computer readable storage medium in determining when to begin a landing sequence of a spacecraft is described herein. It includes flying a spacecraft over the landing pad; storing in the computer readable storage medium an initial state, the initial state corresponding to a non-landing instruction, and requirements for an acceptable state of the landing pad; sensing with the sensor located on the spacecraft a present state of the landing pad; checking whether the present state meets the requirements for the acceptable state, and if so, storing a landing instruction in the computer readable storage medium; reading the landing instruction from the computer readable storage medium to inform the system that landing the spacecraft can be done safely; and initiating the landing sequence of the spacecraft using the landing instruction.

Another example method of landing a spacecraft on an unsafely hot landing pad is described herein. It includes flying a spacecraft over a landing pad with an engine plume directed toward the landing pad; detecting engine plume splash over the landing pad using a thermal sensor; correlating the thermal sensor output to an altitude of the spacecraft over the landing pad site; determining based on the correlating step when landing of the spacecraft can be performed safely; and landing the spacecraft on the landing pad.

Described herein is an engine particle injection system onboard a spacecraft for in-flight landing pad construction. It includes a rocket engine with a combustion chamber configured to burn propellant to create a plume during engine operation; a particle hopper connected to the rocket engine and configured to hold landing pad construction particles; and a particle injector configured to control the injection of the landing pad construction particles from the particle hopper into the rocket engine.

Additionally described herein in an example landing pad constructed on and bound to regolith, soil, or ice of a planet, asteroid or comet. The landing pad includes a microstructure comprising successive layers of landing pad construction particles bound together. Each layer of the successive layers is formed by receiving landing pad construction particles that have deformed with a disc splat mode due to their temperature and high speed at impact.

Additionally described herein is another example landing pad. This landing pad is constructed by deposition of landing pad construction particles injected into the plume of a spacecraft and built up over several layers. The landing pad includes a thicker or denser region in a plume impingement region of the landing pad configured to resist a hole punched through the landing pad by the plume of the spacecraft.

Also described herein in an example machine learning model used to land a spacecraft safely on an unimproved surface. The model includes training the model using inputs of terrestrial in-flight landing pad deployments and terrestrial landing conditions; inputting into the model conditions of an unimproved surface for the spacecraft to land; and using the model to predict landing pad deployment and cooling conditions at the unimproved surface. Optionally, the model's inputs further comprise non-terrestrial landing pad deployments.

There are additional features of the landing pad and method of constructing a landing pad that will be described hereinafter and that will form the subject matter of the claims appended hereto. In this respect, before further explaining exemplary embodiments of landing pads and methods of construction, it should be noted that a landing pad is not limited in its application to the details of construction or to the arrangements of the components set forth in the following description or illustrated in the drawings. The claim set as originally filed are part of the written specification. Their various features can be used in various combinations that a person skilled in the art would realize are possible in addition to as they are written.

BRIEF DESCRIPTION OF DRAWINGS

The accompanying drawings, which are incorporated in and constitute a part of this specification, illustrate examples and, together with the description, serve to explain the principles. The drawings are not necessarily to scale unless otherwise stated.

FIGS. 6A and 6B are side by side depictions of the effect of different spread angles on landing pad diameter while maintaining a constant nozzle height.

FIGS. 7A, 7B, and 7C each contain overhead and cross-sectional drawings of example landing pads having a central region and an edge region with different relative thickness.

DESCRIPTION

Figure 1:
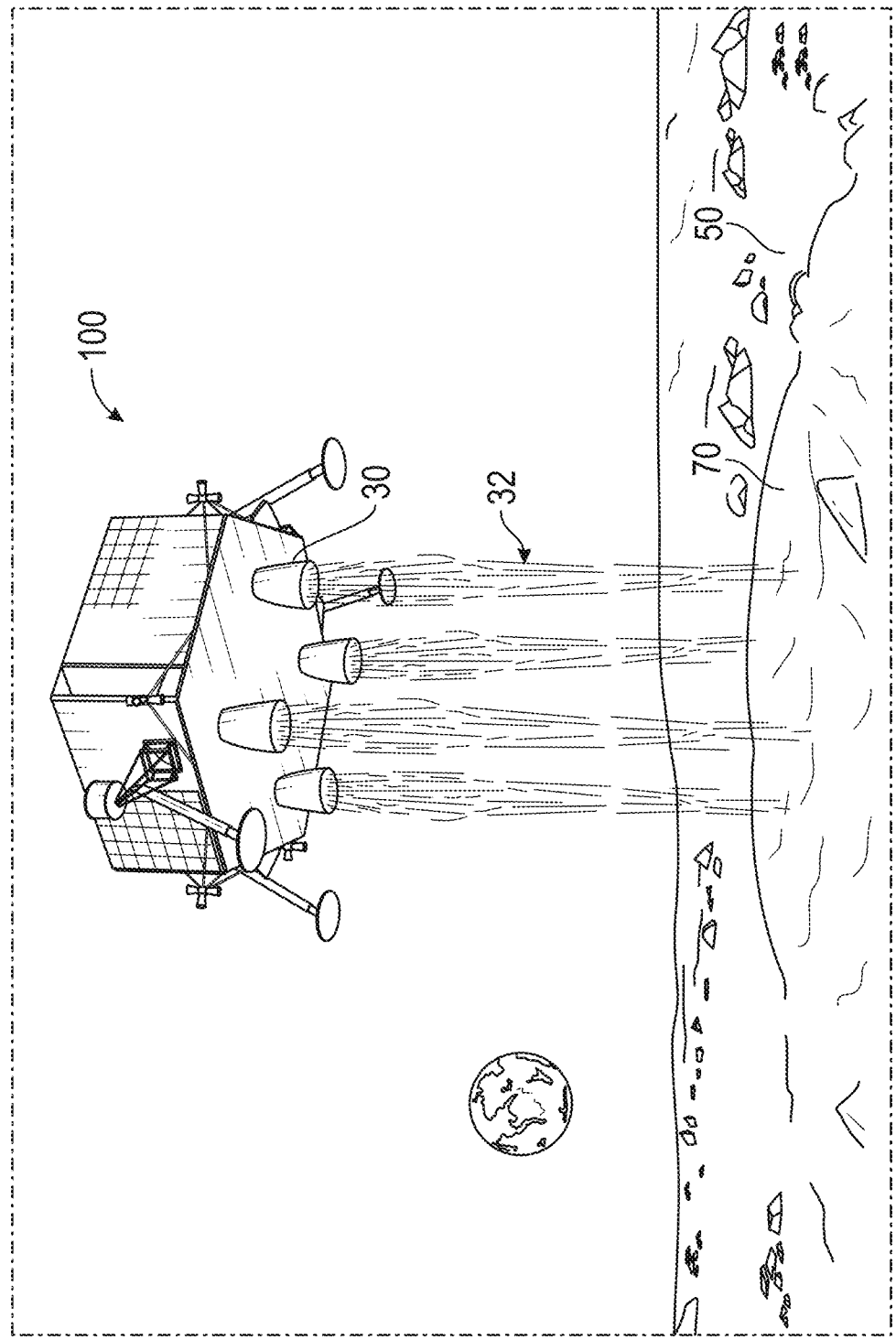
FIG. 1 is an illustration of a first example embodiment of a hovering spacecraft (in this non limiting example, a lander) that is deploying a landing pad.

The present application is directed to several embodiments conceived by Applicant to address the need for landing a spacecraft in unimproved environments, addressing the problem in novel ways that have instant utility in many applications and deliver huge economic savings in early space exploration efforts. This technology is expected to be used for Moon landings during NASA's Artemis and Commercial Lunar Payload Services (CLPS) missions and obviates the need for precursor missions to build landing pads. In April 2020, NASA Innovative Advanced Concepts (NAIC) awarded the Applicant with a visionary award and fellowship for "Instant Landing Pads" for an example embodiment herein. The Applicant also presented aspects of some of the embodiments herein at the NIAC Symposium in September 2020.

Uncontrolled ejecta can cause many problems. To mitigate those problems, or to ideally avoid them altogether, this invention minimizes regolith displacement by controlling the ejecta around the landing pad. Another problem associated with uncontrolled ejecta on the Moon is that particles may be thrown into low lunar orbit. These particles can cause significant environmental disturbances and impact other spacecraft and missions. A different problem of uncontrolled ejecta occurs when a spacecraft is trying to land in proximity to other surface assets. The displacement of regolith and the resulting ejecta from a spacecraft's landing or liftoff plume may cause damage to nearby surface assets. This type of damage was observed during the Apollo 12 Moon landing, when ejecta displaced by the landing of the lunar module Intrepid sandblasted the nearby Surveyor 3 probe. These types of problems can be prevented by constructing a landing pad in-flight at the landing site, thereby enabling the spacecraft to land with relatively minimal disruption to the surroundings.

Example embodiments herein provide for the building of an ablation-resistant landing pad to be created in-flight while the spacecraft is hovering or descending. Some benefits of the solutions herein are reducing the risk of spacecraft landing when no landing structures or equipment are present beforehand, enabling the creation of a landing pad on-the-fly and during descent, preventing deep cratering below the spacecraft, minimizing ejecta, blown dust, and other lofted particles, enabling landing in a variety of unimproved environments, providing a safe structure for both descent and ascent of the spacecraft, removing the need for expensive precursor missions to build landing infrastructure, allowing safe diversions to unplanned locations, and increasing vehicle reusability by preventing damage during landing, surface operations, and liftoff. Applicant has modified a spacecraft to enable an in-flight generated structural landing pad that can be deployed rapidly whenever and wherever the spacecraft operator wants to land. This landing pad largely eliminates ejecta-related problems discussed above, such as lack of visibility and damage to the spacecraft and nearby assets from blast effects and displaced regolith.

Other objects and advantages of the various embodiments of the present invention will become obvious to the reader, and it is intended that these objects and advantages are within the scope of the present invention. To accomplish the above and related objects, this invention may be embodied in the form illustrated in the accompanying drawings, with attention being called to the fact, however, that the drawings are illustrative only, and that changes may be made in the specific construction illustrated and described within the scope of this application.

The example embodiments are able to construct thin, highly dense landing pads while the spacecraft is hovering over or descending upon a landing site. The example landing pad manufacturing embodiments have high input energy requirements but are able to harness the energy from the spacecraft's existing rocket engine(s) or specially designed rocket engines created for the landing pad deployment. The desired energy transfer is achieved by propelling the landing pad construction particles at the target or transferring the rocket engine's combustion and/or plume heat to the landing pad construction particles. Despite this high energy cost, the thin landing pad requires relatively few input materials and can be easily and cost effectively transported onboard a spacecraft.

Deploying a Landing Pad While in Mid Flight

Successful in-flight deployment of a landing pad, as described herein, requires a few components. First, a rocket engine is needed that can point towards the unimproved surface, e.g., the ground, regolith, ice, or soil. The rocket engine(s) are injected with landing pad construction particles, which absorb heat and exit the rocket engine at high velocity in the direction the rocket engine is pointing. These landing pad construction particles impact the unimproved surface, thereby building a coating layer by layer until the coating becomes a usable landing pad.

FIG. 1 illustrates an exemplary embodiment of a spacecraft depositing a landing pad during its descent phase. The spacecraft 100 can be seen with the plume of rocket engine combustion chamber 15 (shown in FIG. 2) exiting nozzle(s) 30. The plume 32 is pointed at surface 50 and deposits heated and high velocity landing pad construction particles thereon, converting the surface into a landing pad 70.

The spacecraft shown in FIG. 1 is a Masten XL-1 lander configured for a CLPS mission. The image shows 4 bell nozzles corresponding to 4 rocket engines, each able to deposit its own landing pad or to collectively build one larger landing pad. This embodiment also works equally well with a single nozzle spacecraft, such as the Masten XODIAC™ vertical takeoff vertical landing (VTVL) rocket.

Spacecraft 100 can be any kind of vehicle where a rocket engine is built into, integral with, or can be added on that can be directed at a surface to deploy a landing pad using the methods herein, though it is acknowledged that some spacecraft designs may not be suitable for using the landing pad embodiments herein. A non-exhaustive list of spacecraft for which the methods and systems of the present invention are suitable includes landers, rovers, rockets, helicopters, and VTVL or vertical and/or short take-off and landing (V/STOL) airplanes. The rocket engine can be, but does not need to be, the primary engine or motor for propulsion. In fact, a spacecraft could add a rocket engine for the specific purpose of deploying landing pads in specified environments. Among other things, the spacecraft's weight, footprint, approach, and booster configuration can be considered based on the deposited landing pad's design.

A geometry of an example rocket engine's combustion chamber used to deploy the landing pad can be designed based on the preferred characteristics of the landing pad. In some embodiments, the landing pad construction particles are intended to absorb heat from the rocket engine or its plume until such particles start to melt. A rocket engine with a longer length allows more time for the landing pad construction particles to absorb heat through the passage through the engine. The length can be measured from the injection site to the exit. In other embodiments, a rocket engine with a shorter length allows less time for absorbing heat but can still propel the landing pad constructions particles to a speed where a cold particle can achieve a splat, e.g., a disc splat, and form a landing pad. A cold particle, as used herein, is one that remains below the liquidus line on the particle's phase chart, as opposed to a cold particle that passes through the rocket engine without absorbing heat. Because the rocket engine used to deploy the landing pad can, but is not required to, be the primary thruster of the spacecraft, this rocket engine can be adapted for the intended mission.

A custom-designed geometry of the engine or nozzle can be adopted to optimize the landing pad's properties, shape, or performance. The flow exit pressure, and therefore nozzle diameter, relative to the external pressure can be used to control particle trajectory, along with throat size and engine contraction and expansion ratio. Boundary layer flow can also be added to influence combustion and turbulence conditions in the chamber and nozzle to further direct and orient particle flow. The particle trajectories then influence landing pad dimensions and properties. Other geometry modifications can include injector design changes to allow particles to be added, injector geometry changes to use combustion and mixing effects in a beneficial way to accelerate and heat the particles, and an over- or under-expanded nozzle to further direct the trajectory and scatter of the particles once they leave the engine. The material of the engine may be a superalloy such as niobium or columbium, such that no cooling channels are required, thereby minimizing the risk of damage to the engine from particle impingement. When "diameter" is used in the context of the landing pad itself, the term is a general measure of the distance from one side to the other. It does not limit the landing pad to being circular in shape.

The weight and the number of landings of the spacecraft are considerations for the desired properties of the deployed landing pad. Lighter spacecraft need to be concerned with the geometry to ensure appropriate ground coverage to minimize ejecta. Heavier spacecraft with larger thrusters benefit from a thicker and more flexible landing pad. Additional flexibility can be designed into the landing pad by introducing, among other things, porosity. The porosity may influence local crush and deflection of the landing pad, enabling it to withstand larger vehicles landing on it without failure. The materials may also be adjusted to enable particles with higher modulus of elasticity which will bend or plasticly deform under load instead of fracturing. Additionally the interface layer between the surface and the first landing pad layer is important for durability, with more compaction resulting in less stress on the first pad layer. Flexibility may be desirable to prevent fracturing of the landing pad when the landing gear makes contact and from the stagnation pressure of large rocket engines. If fracturing occurs instead of flexing, the crack becomes a flow trip or stagnation point, resulting in increased heating in that area, degradation of the pad, and progressive pad failure. The rate and size of particle impact can be adjusted to influence porosity of the system, with colder, larger, and slower particles resulting in more porosity than smaller, faster, and hotter particles.

Another repair option is to deploy a landing pad over a previously deployed landing pad site, even one with some spalling, taking care to coat the prior landing pad site with landing pad construction particles at appropriate velocities to adhere them to the existing substrate. The type of particles used will be influenced by the substrate, with the desire to minimize coefficient of thermal expansion and thermal conductivity differences. The ideal case would use the same materials in the repair as the substrate.

Throughout this specification, the word "ground" and "surface" are intended to be synonyms with equivalent meaning. Any soil, bedrock, regolith, asteroid surface, comet surface, or lunar, planetary, or celestial body would be appropriate for surface 50 with appropriate parameter adjustments. These substrates are typically granular, which makes them difficult to apply the learnings of nearly all known terrestrial coating technologies. This granularity and lack of preparation makes deposition of the first layer critically important and challenging. The velocity of the particles typically is significantly higher than nearly all terrestrial coating technologies, which creates complex impact dynamics in both the regolith and the particles, influencing impact heating and splat dynamics. The high velocity, semi-molten or molten particles of at least some of the example embodiments glassify the surface upon impact to create a workable landing pad over a granular surface. Other embodiments include colder particles stacking up on top of each other to create a compressed base layer of a known material. The particle impacts in rapid succession act to reduce ejecta splash effects when the impact time gap is shorter than the bearing collapse of the impact crater—this is influenced both by the regolith characteristics but also the gravity strength of the body that the landing pad is being deployed to. Starting surface temperature and thermal conductivity will influence the cooling rate of the deposited material. The environment around the surface will also influence the cooling rate, with deployment in a vacuum requiring radiation to cool the top layer to space. A deployment on a surface with an atmosphere, like Mars, will also have the benefit of convection to cool the deposited layers. Surface irregularities may result in areas where deployed pad is masked by rocks or thermal gradients influence cooling rates and the final mechanical properties.

When propellant, also known as fuel, is combusted within the rocket engine, a plume extends out from the rocket, typically exiting through a nozzle. The propellant powers the rocket engine as the highly directional chemical energy source. The simplest manufacturing method does not rely on the propellant or the propellant exhaust chemically changing the landing pad construction particles. Therefore, most present and anticipated future commercial propellants would work for this purpose, such as LOX/IPA propellant, methane/LOX, H2/LOX, NTO/MMH bipropellant, MXP-351™ propellant, hypergolic bipropellants, nitrogen tetroxide (NTO), or monomethyl hydrazine. Most likely, the choice of propellant will be identical to the propellant already in use to propel the spacecraft. However, it is also possible to introduce a different propellant or mixture of propellants for landing pad deployment. Propellant choice impacts exhaust velocity, which will influence particle velocity; this is based on combustion characteristics and molecule mass of reactant products. Oxygen/Hydrogen reactions provide some of the highest exhaust velocities. Additionally or alternatively, the propellant choice may depend on whether it is desirable for the landing pad construction particle to react with the plume gases and/or the heat needed to be absorbed by the particles at the deployment distance above the surface with all the other variables. Oxygen/Kerosene plumes have a higher carbon and soot content imparting more thermal energy into the particles from the plume. Additionally or alternatively, the choice of propellant may also depend on the atmospheric gases or the lack thereof.

An example embodiment is the XODIAC™ VTVL lander. Its nozzle has an approximately 8-inch diameter. Its engine uses a LOX/IPA propellant.

The rocket engine heats and propels the landing pad construction particles 10. Many plume-generating engines could work here. Some examples of engines selected from Masten Space Systems are the Broadsword™, Cutlass™, Katana™, and Machete™ engines. As the thrust and/or size of the rocket engine used for landing and takeoff increases, the required size of the landing pad also increases (even if deployed from a different rocket engine). Electric thrusters may also be used but need to take the natural potential of the environment into account and counter it with a reverse charge. By way of example, the moon has an electric potential that would need to be countered. It would also be possible to pre-charge the powder feedstock. There are no limits on the number of engines that can simultaneously or alternatively deploy landing pads, nor are there limits on the number and type of engines which may be used on a single spacecraft.

Figure 2:
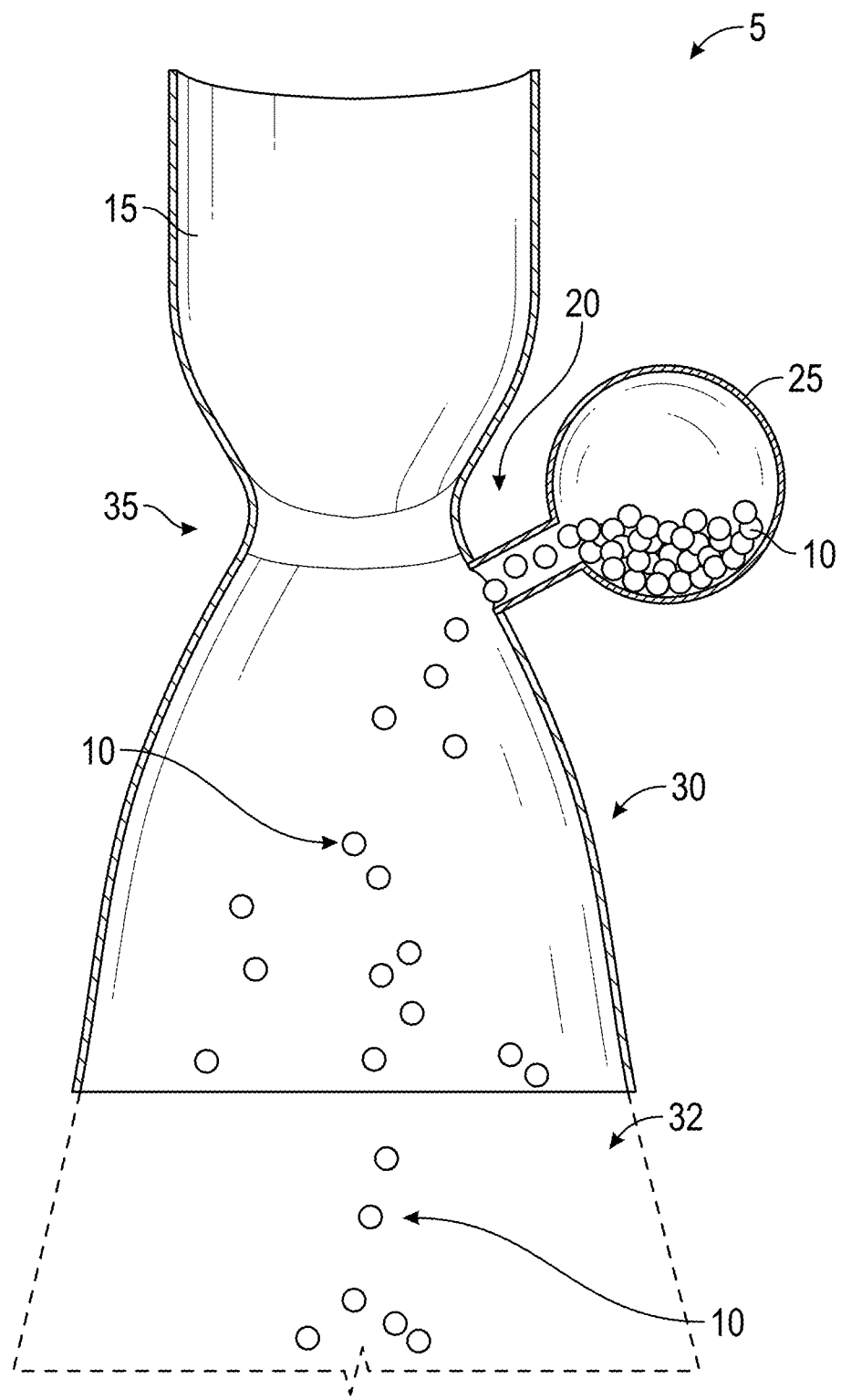
FIG. 2 is an illustration of a cross sectional view of landing pad construction particles being injected into a combustion rocket engine of the first example embodiment.

Taking a closer look at the rocket engine itself, FIG. 2 is a cross-sectional diagram illustrating an exemplary embodiment of a rocket engine 5 of a spacecraft 100 that can be used in the in-flight construction of a landing pad 70. Rocket engine combustion chamber 15 provides the heat and propulsion source for the landing pad construction particles 10 on their way to surface 50 (not shown). Just past the throat 35, landing pad construction particles 10 are injected at the injection site 20 from the particle hopper 25. Landing pad construction particles 10 begin partial melting in the plume of rocket engine combustion chamber 15 within the nozzle 30. Due to the forces from rocket engine combustion chamber 15, the landing pad construction particles 10 are projected at the landing pad construction site (not shown) at ballistic trajectories and high speeds.

Each rocket engine 5 can be built with or retrofitted with an engine particle injection system including a particle hopper 25 for holding the length of construction particles and a particle injector (not shown) that controls the injection of the landing pad construction particles from the particle hopper into the rocket engine. Known and future methods of controlling the injection of particulate matter from plasma spraying and other coating disciplines can be used. One such example of a particle injector is an electronically controlled actuator. Additionally or alternatively, mechanical systems like centrifuges, screw drives, sifters, and vibrators can be used to ensure even particle injection. Particle injection could be accomplished using the venturi effect to draw in particles to the flow or through a pneumatic system. If the deploying engine needs to start from a micro-g, zero-g, or free fall condition the particle injection mechanism must be able to accommodate that condition. There could be multiple hoppers connected with a single rocket engine. Each hopper could have its own landing pad construction particles, and such particles can all be of the same type. Additionally or alternatively, each hopper can have different landing pad construction particles. Additionally or alternatively, each hopper can have more than one type of landing pad construction particles within it. If multiple particles are used in a hopper, the distribution may be graded such that one type of particle is deployed early on and a different one later on to control layer distributions. While only one particle hopper 25 is shown, there can be multiple particle hoppers. Different injection sites 20 can be used to insert the same material at different sites for a more even distribution within the nozzle. Additionally or alternatively, different materials at different sites to change the mix of landing pad construction particles that constitute the eventual landing pad. The hopper can be any storage or reservoir for the landing by construction particles. The particle hopper 25 is approximately 30-80% by volume larger compared to the cumulative maximum volume of particles carried to account for imperfect packing of the particles.

Durability

Some landing pads only need to be effective for a single landing. Some need a landing and a subsequent ascent. Other landing pads might have a longer useful life. The properties of the landing pad should be targeted towards the landing pad's intended use and the mission's needs. Thicker landing pads are more durable, which benefits heavier spacecrafts and larger engine plumes. More durable pads may also include additional structural reinforcement or different pad-to-surface interface layers to better accommodate thermal cycling of the system. Different reinforcement methods for durability would be utilized for Moon versus Mars versus Earth designs.

Materials

Alumina (aluminum oxide) is an example material used in the landing pads, systems, and methods herein. Alumina is a desirable material for these applications due to its light weight, high strength and high hardness, chemical inertness, ability to withstand high temperatures, and history as a spray application thermal coating. In addition, alumina is readily available on earth and can be generated via in-situ resource utilization (ISRU) on moons or other planets. Beyond alumina, the methods and landing pads herein can use any materials that work to create a usable landing pad or similar rocket engine coating-created structure for various applications. Example materials that can be used for the landing pad construction particles include sodium silicate, copper, silica carbide, nickel superalloys, titanium dioxide, resins enhanced with carbon or wood materials for ablation, or other coating materials for high temperature applications.

The landing pad construction particles can be engineered to improve the process or the resulting landing pad. Examples of engineered particles include coatings, layers, surface modifications such as doping, using multiple materials, or using combustible materials which can add energy to the reaction. A combustible material, such as pure aluminum, may be used on the external surfaces of particles to combust in the rocket engine, thereby adding additional energy to the system and encapsulated particles. Alternately aluminum plus iron oxide could be used as the core with an alumina ceramic coating. As the coating heats up, the aluminum and iron oxide core would combust, creating internal heat for the particle. This heat would enable the particles to travel for a greater duration without solidifying due to radiation losses. This allows for either slower particle speeds at a lower altitude or higher altitudes with faster particles. Aluminum is used as an example due to its frequent use in solid rocket motor propellant mixes. Alternatively, a low emissivity coating may be placed on the outer surface. The primary heat gain mechanism in the engine is convection, accounting for over 80% of the thermal energy gain, and the primary heat loss mechanism once the particle exits the engine is radiation. The radiation losses are significant, due to the particles' high surface area to volume ratio. A low emissivity coating on the external surface of the particle therefore does not adversely affect heat gain while reducing heat loss during flight.

Engineered particles can take advantage of different melting points and material emissivities. Aluminum has a comparatively low melting point, while aluminum oxide has a high melting point. And advanced metals such as niobium or columbium also have high melting points.

The coatings would be part of the particles in the hopper, so the deployment method would not change at all. The coatings are intended to maximize the heat transfer into the particles in the engine, minimize the radiation losses in flight, and perhaps influence the splat on impact. The hopper may include heaters to preheat the particles before injection into the engine. This can reduce the required dwell time in the combustion chamber and therefore reduce the mass of the system.

The particle characteristics and particle splat geometry can be optimized for the circumstances required of a specific landing pad construction or construction site. An example landing pad construction particle heats up through the rocket engine and then its coating, with a higher solidification temperature than that of its center, "freezes" into a shell through radiation losses during flight. That would insulate the interior molten or semi-molten center, keeping it more liquid for impact.

A different example landing pad construction particle has a doped outer layer of the landing pad construction particle to initiate an exothermic reaction in the rocket engine, further heating the interior particle. This exothermic reaction could be self-sustaining or pick up oxygen from the engine plume to provide an oxidizer component for the reaction. An example of a doped outer layer could be metallic aluminum and iron oxide compressed into a shell. When heated in the combustion chamber, the oxidation reduction reaction will add additional heat to the particle. This heat may be beneficial for heating in some instances because it would require less dwell time for the particle in the combustion chamber, possibly continue reacting after leaving the engine, and enable heat transfer to the particle interior via conduction instead of convection.

Another example embodiment has an exothermic reaction occur in the particle core. When the outer shell heats up in the engine and conducts that heat to the core, the core continues to react and generate heat during travel. This embodiment can withstand higher thermal radiation losses and still result in the desired disc splat or other intended mode. This type of landing pad construction particle can remain effective at higher altitudes by maintaining its temperature during its flight to the surface.

Injection Location

The injection location is a relevant consideration in designing a rocket engine because the injection location determines the path the particle travels and therefore how much time the particle has to absorb heat in the rocket engine and the plume before it starts its cooling descent to the landing pad construction site. The above example, illustrated in FIG. 2, shows the injection location near or even downstream of the throat. This injection location has the advantage of propelling the landing pad construction particles while decreasing the dwell time in the rocket engine. This configuration benefits a process where cold particles are desired.

A different example embodiment uses the location upstream of the throat. For example, an injection location near the center of the propellant injector provides more dwell time in the combustion zone with high temperatures and a longer rocket engine dwell time transferring more heat to the landing pad construction particles. This configuration benefits a process where warmer particles are desired. Additionally, this injection location can result in a straighter path (less dispersion) for the landing pad construction particles to pass through the rocket engine and a lower probability of impacting the walls of the rocket engine. This configuration can also aid in the particle stream mixing the rocket engine propellants through shear forces and thereby improve overall engine combustion. Injection of the particles at the injector face also enables the use of the propellant as a pneumatic working fluid to push the particles into the combustion chamber. This has several positive effects on the system, including elimination of an inert working fluid, such as helium or nitrogen, which results in a dramatic mass savings for the system. It also helps ensure particles are in the combustion regime, as they are surrounded by propellant and aid in mixing the propellant with the oxidizer, preventing dilution, and quenching the propellant ignition source with an inert gas. Using propellant as a pneumatic working fluid also helps drive the overall system towards a hotter stoichiometric reaction rate. This hotter reaction rate enables greater heat transfer to the particles in a shorter time frame. Coaxial injectors may be used, including swirl coaxial injectors where the central core of the center element is void of propellant due to the swirl effects. The particles may then be injected through that central core to end up in the center of the mixing flame front, again maximizing thermal and momentum transfer to the particles while minimizing turbulence effects which may scatter the trajectory. This should optimize the conditions for the desired particles while minimizing dispersion and scatter, thus facilitating efficient deployment and enabling the spacecraft to carry a lower mass of particles on the mission.

Feed Rate

This injection of the particles can be in coordination with the propellant elements such that the combustion process more effectively heats the particles. The particles passing through the hottest zones of combustion will be most exposed to heat. In an example coaxial injector embodiment, mixing usually occurs along fluid shear planes, so the insertion of the landing pad construction particles near the coaxial injector may enhance the mixing of the propellant and oxidizing agent increasing combustion performance.

The feed rate of landing pad construction particles depends on the injection location of the particles. Assuming the quantity of the particles injected is not close to the point of altering the plume characteristics of the rocket engine, changing the feed rate will not have much effect on the rocket engine. At a given level of the engine throttle and the spacecraft's altitude, the particles of a given composition and given size will all land at or near the landing pad construction site at approximately the same temperature.

How quickly the particles bombard the landing pad construction site may affect the cooling rate of the layers of the landing pad. An example feed rate at a single injection site or multiple injection sites within the same engine is a magnitude of 100-200 kg/min. An example sub range of injection rate for a lunar landing pad capable of withstanding an Apollo scale lunar landing is 27 kg of alumina ceramic deposited over 10 seconds into an area of 6 m diameter at a thickness of 0.25 mm. This equates to a deposition rate of 162 kg/min.

Particle Size

The particles' size should be fairly small so that they can absorb enough heat while passing through the rocket engine in the plume yet large enough to not lose all of their heat as they travel to the surface. An example range of the particle size (diameters) of the alumina embodiment is less than 1 cm, and a further range is between $1/100$ of a millimeter and 1 cm, and an even further range is between one half of a millimeter and one half of the centimeter.

Other materials, like an epoxy or a cement, may be self-hardening materials that can land as a liquid and then harden after they contact the surface. These materials can be dropped in preparation for landing.

Metals, ceramics, cermets, and the like are good candidates for particle materials because of their ability to be transported in powdered form and their structural integrity at high levels of heat and the various other conditions that the spacecraft may be exposed to. Each of these materials is capable of a disc splat using the described methods. Determination of the splat conditions will depend on the temperature of the particles and their velocity relative to their melting point.

Figure 3:
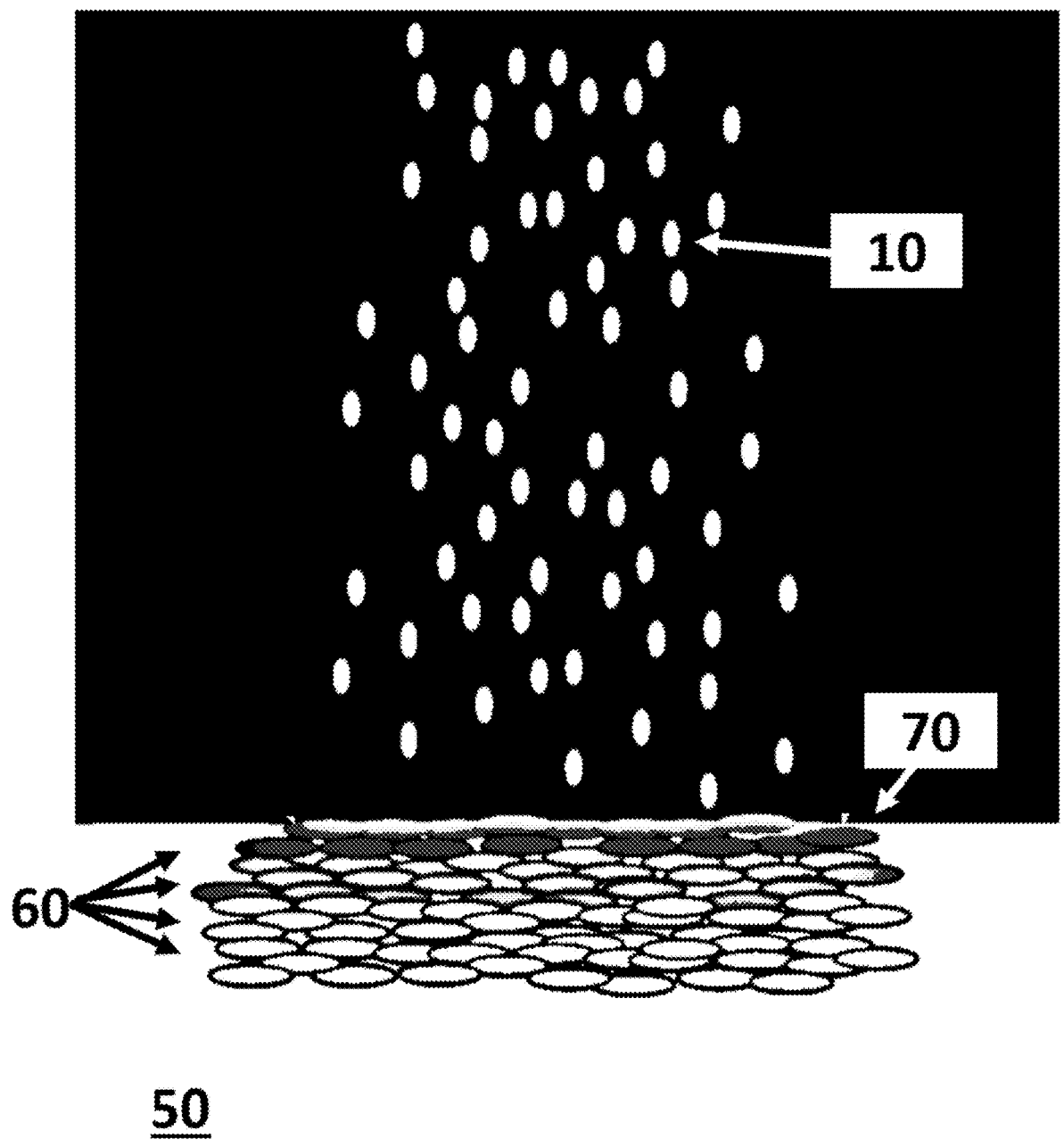
FIG. 3 is an illustration of a closeup of a landing pad being deployed under the first example embodiment.

Regolith is non-cohesive, and that fact provides some flexibility between expansion and contraction of the landing pad before, after, and while it is being deposited. The flexibility should result in less stress in the coating. Less stress is desirable as it prevents spalling, flaking, and cracking of the landing pad. The initial construction pad particles will at least partially melt or sinter into the top layer of regolith. Subsequent layers of construction particles will partially melt or sinter into the prior layers of construction particles. The term "layer" is used loosely in that a time-based buildup of landing pad construction particles in a column at the landing pad construction site creates a landing pad, as shown in FIG. 3. It is easy to visualize one layer at a time cooling. In reality, it may be a more continuous change from the bottommost particles in the landing pad to the then-top of the landing pad, with respect to cooling and other material properties.

The entire landing pad may be constructed of a single type of construction particle or from various types of construction particles. Even within the same material, different size and shape particles may be used.

Multiple materials can be used throughout the landing pad, whether in one or more blended combinations of materials, in relatively homogenous layers, or in some combination thereof. For example, depending on the characteristics of the regolith and the type of construction particles, an operator may choose to have a different material used as a binding or a primer layer.

Sometimes it may be desirable to begin melting the regolith layer before commencing the deposition of the construction particles.

To create extra flexibility in the landing pad, additional materials may be used to add inclusions between the disc splats. Ideally, materials that could act as stress contractors upon high heat should not be chosen for such inclusions. Known ceramic or metal additives can be used within the landing pad construction particles to adjust the flexibility or the strength or the thickness or the thermal properties or the porosity or other characteristics of the landing pad for different applications.

Preventing Hole Punches

To avoid some of the undesirable effects discussed herein, a suitable landing pad is needed in situations where a downward combustion engine points at the landing pad through the completion of the landing. An unsuitable landing pad can fail through a variety of mechanisms. A typical candidate is continuous ablation by the rocket engine's plume that results in pad spalling. The combination of the heat and the high gas velocity from the plume can cause a hole to be punched through an unsuitable landing pad. After the hole is created, then the heat and the high gas velocity of the plume continue to scour beneath the landing pad the areas below and scour around the hole until the landing pad's foundation is destroyed and the landing pad ultimately fails. Therefore, a landing pad that can avoid a hole punch scenario during use is a benefit to the landing process. Different approaches can be used to design the landing pad to minimize hole punches. The first approach is to construct a landing pad that is robust enough to avoid being materially damaged by pressure or temperature during a landing. A second approach is to construct a landing pad that is designed to fail in a certain way that does not allow the hole punch scenario to occur immediately. For example, designing the landing pad where the layers diffuse the heat via extremely high thermal conductivity and ablate off in a much broader area than the rocket plume penetration point prevents the concentration of energy at the penetration point. This would enable a lower average temperature over the pad, and may be achieved through methods such as embedding diamonds or carbon nanotubes or suitable filaments in the material. Another strategy is to add a char layer on top of the landing pad to slow down failure from the direct effects of the rocket plume. This approach is used by ablative heat shields, such as phenolic, pica, or cork materials.

Altitude

For the purposes of describing the setup herein, Applicant uses the continuous flow from a spacecraft that is hovering over a landing pad construction site at an initial height that is high enough to prevent cratering in the regolith from the plume's ejecta. While it would be possible to deploy the landing pad very close to the ground (e.g., 1 m), doing so may defeat some of the purpose in that the engine plume would kick up ejecta and widely disperse it around the vicinity of the landing site. Once such ejecta has been created, the ground may become so disrupted that a deployed landing pad cannot correct the disrupted surface enough for a safe landing.

On the other end, the deployment altitude (nozzle height $h_n$) can be safely far from the surface, up to hundreds of meters away. An example deployment altitude range could be less than 100 m. In at least one example embodiment, the deployment altitude range is between about 30 m and about 100 m. And another example deployment range can be between 30 and 40 m.

A lower deployment altitude may be desirable if wind is present in the atmosphere between the spacecraft and the surface—note, however, the Mars discussion below about adapting to lateral wind velocity. In atmosphere-less vacuum environments like the Moon, an example deployment altitude range may be between 5 and 35 m. In higher atmospheric gasses and very windy environments, the altitude may need to be lower.

At larger nozzle heights, the particles have more time to cool based on the surrounding temperature conditions. The spacecraft can be farther away from the surface 50 if it heats the particles 10 up to a higher nozzle exit temperature (e.g., by using higher engine throttle) while still achieving the same or a similar particle impact temperature. If there is atmospheric drag or wind, then a larger nozzle height will slow the particle impact speed and result in more horizontal variation in where the particles land. At the highest possible altitudes where an effective deployment is still possible, more particle loss will occur, resulting in reduced efficiency. The particles can be injected into the center of the plume to tighten up the clustering and reduce the mass loss.

By way of an example, in a lunar landing pad deposition, Applicant should be able to achieve a deposition time at a deployment altitude of 50 m on the order of 10 seconds to achieve a 0.5-centimeter deposition.

Velocity

The particle size must be small enough for particles to absorb enough heat during passage in the rocket engine and large enough for the particles to not lose all absorbed heat as they travel to the surface.

A particle's velocity as it hits the surface is also important. If a particle impacts the surface at too high of a velocity, it will create a crater. Conversely, if a particle impacts the surface at too low of a velocity, it might bounce off the surface or not achieve the desired density.

After ejection from the nozzle, the particles are ballistic. Impact speed, particle characteristics, and impact temperature will determine particle cohesion and splat type upon impact with the surface. In low atmosphere environments, velocities can be on the order of kilometers per second. For example, at a plume temperature of 2500 to 5000 K, the alumina landing pad construction particles may reach temperatures of 2500 to 3000 K, and may be propelled to the surface at an example impact velocity range of 2 to 4 km/s.

Thickness and Deployment Times

Each layer is formed from landing pad construction particles deforming and solidifying into the surface. Smaller particles can absorb the heat faster from the engine than larger particles can. When smaller particles are used, an example layer thickness is between $1/1000^{th}$ of a mm to 1 mm. The layer thickness will correlate with the particle size. In this embodiment, the layers are created because of random particle impact locations piling up over prior particle impact locations. In other embodiments, the injection can be pulsed, timed, and/ or irregular to allow for additional cooling of the prior layer(s) and layer control. Total thickness of a quickly deployed landing pad may be, for example, on the order of 0.25-2 cm. The deposition type can be a continuous flow, passes, or other coating variations used, enabled by the motion of the spacecraft, spray angle control, propellant amount and type control, booster control, and any plume control. The deployment time can be tuned to enable optimization of the cooling of each splat layer. Deploying too quickly may not allow adequate time for the heat to radiate or conduct away. By optimizing the cooling rate of the layers, such as sequential batch injections or the other techniques described herein or understood by a person skilled in the art, the landing pad's overall cooling rate can be minimized.

As an example calculation, assuming each layer is deposited at 5 μm thick for a duration of 10 ms per layer with a target landing pad thickness of 1,000 layers to equal 0.5 cm, landing pad deployment time would be about 10 seconds. Example deployment times are between 5 and 15 seconds and could be shorter or longer based on the other parameters of the deployment. For example, a slow descent landing could take about 60 seconds during which a relatively thick landing pad could be deployed.

Greater landing pad thickness is needed for longer durability and larger engines. The higher the thrust of the rocket engine landing, the thicker the landing pad needs to be.

FIG. 3 is an illustration depicting creation of a landing pad 70. Landing pad construction particles 10 at high temperatures and ballistic velocities are deposited in layers 60 successively on the surface 50. Upon exiting the engine near-field plume environment, the particles may be in a soft vacuum (if deployed in a low- or no-atmosphere environment) where radiation is the dominant form of heat loss. The heat loss will determine how quickly the particles cool as well as the optimal altitude above the lunar surface for the vehicle to deploy landing pad construction particles. Aerodynamic forces will be minimal in this soft vacuum, as the propulsion gasses are diffuse and traveling along a similar vector to the particles. As the particles move farther from the nozzle, they will enter a hard vacuum and only be subject to radiation thermal losses. In order to properly impact the surface, the particles must absorb enough heat from the engine to deform and pancake without shattering, embedding into the regolith, or splattering completely. As particles repeatedly impact in the same areas, they will start to build up over each other, with the impact forces providing enough energy to fuse them together. The particles will start to lose heat to the lunar surface and thus cool down into a solidified landing pad. The rate of cool-down depends on the surface conditions, the materials used, and the particle temperatures at impact.

The pad size is influenced by spacecraft altitude and dispersal angle. The area of the pad is related to the splash distances from the plume impingement.

The landing pad construction particles may impact the surface in different ways, based on, e.g., their material, temperature, angle of impact, particle size, and differences in velocity. Referring now to FIGS. 2 and 3, the particles undergo significant temperature changes throughout the deployment process, starting from sitting in the hopper 25, entering into and absorbing the heat of the engine's plume 32, flying through the low temperatures of space or the atmosphere at ballistic velocities, impinging the surface 50, and eventually cooling down to the surface temperature.

For hotter surfaces, a landing pad that acts as an insulator can shield the spacecraft from the surface. Depositing insulating particles such as ceramics can help create a safer area for landing. The alumina embodiments described herein, among other designs, could work for this purpose.

Achieving a Disc Splat

A type of surface impact of interest with alumina particles for in-flight landing pad construction is a disc splat, which occurs when the landing pad construction particles impact the surface in such a way that they become flattened into a pancake-like shape. As shown in the illustration in FIG. 3, a disc splat is created when a particle, at least partially molten, impinges on the surface 50, flattens against the surface 50, and then solidifies. The rate of solidification impacts whether the splat is a disc splat or a different mode. If a particle solidifies too slowly, it may spatter upon impact. If a particle solidifies too rapidly, it may result in a freezing-induced breakup. An intermediate rate of solidification can yield a disc splat with the particle deforming but ultimately remaining intact on impact.

To achieve the disc splat mode, the time scale of impacts is very short, with the primary spreading called the post critical flow regime controlled through the following equation [1]. The variables are $d_p$ is the particle diameter, $v_p$ is the velocity of the particle, rho is density, Eta is dynamic viscosity, and Re is the Reynolds number. In general for coarse surfaces the flattening time is ~2.20 us with a splat height of 5.2 um.

$$t_i = \frac{2d_p}{3v_p} \text{Re}^{0.2} \text{ and } \text{Re} = \frac{\rho_1 d_p v_p}{\eta_1} \quad (1)$$

To determine approximate splat thickness via lamina thickness, we can use the time of impact information.

$$h = d_p - v_p t \quad (2)$$

Using these equations, a series of particle sizes and velocities was reviewed for alumina particles, resulting in the following trends. These results are an approximate starting point, as based on the form of the equation the velocity * time component goes out of bounds, negative, when driven higher than the particle diameter. This is a symptom of extending landing pad boundary conditions outside of the bulk of current research. There is likely a divergence where this model breaks down in these plots, therefore this needs to be verified with future testing.

As this technology can be used in environments of different atmospheric temperatures, ambient pressures, atmospheric gases, surface temperatures, engine types, and spacecraft sizes, among other possible differences, the inputs and variables associated with the landing pad deployment system should be adapted and optimized to the specific environment.

FIG. 3 depicts an exemplary landing pad deployment close to the surface to illustrate the deformation of particles 10 into disc-shaped particle splats which collectively form a landing pad 70 upon impact with a surface. While different types of particle splats may work in different environments and for different purposes, for a lunar environment, a disc splat of the particle into a single pancake-shaped disc with sufficient adhesion to the surface 50 or the prior deposited layer(s) of landing pad construction particles will build up the landing pad layer-by-layer into a robust landing pad capable of withstanding the downward engine plume and minimizing ejecta.

As successive layers of these particles 10 undergo a disc splat during deposition of the landing pad 70, a well-constructed surface with good internal adhesion due to processes like sintering between the flattened particles can be formed. Each layer begins cooling as it contacts and becomes integrated with the surface and the prior landing pad layers. Although FIG. 3 shows the landing pad 70 flush with the surface as a result of landing pad construction particle impacts penetrating below the surface, it is likely that the highest point of a thick landing pad would be higher than flush with the surface.

In an example embodiment where alumina is deposited on lunar regolith, the disc splat is preferred over other known types of splats, such as a splash splat or a resolidified spherical splat. However, other types of splats may be useful for other materials or other environments. For example, a semi-melted spherical splat could be a desirable alternative to a disc splat when the landing pad thickness needs to be built up more rapidly with fewer layers, and where void space between the spherical splats may be beneficial. In some situations, it may be beneficial for the particles to be molten droplets at the time of impact with the surface. This may be possible in lower altitude deployments where dust and ejecta are not as much of an issue and where lower velocities are achievable. Splash splats can "wet" or cover the surface more rapidly, which may be useful in environments with reactive regolith.

The mode of the particle impact dynamics depends on a number of factors. In one example rocket engine design, a propulsive force is primarily transferred to the particles. This regime depends on the speed of impact for achieving the desired particle impact. In a 2nd example rocket engine design, both a propulsive force and heat are transferred to and absorbed by the particles. To impart greater heat to the particles in such an embodiment, the rocket engine and particle injector are configured such that particles travel a greater distance and/or for a longer period of time within the rocket engine, thereby absorbing more heat.

Figure 4:
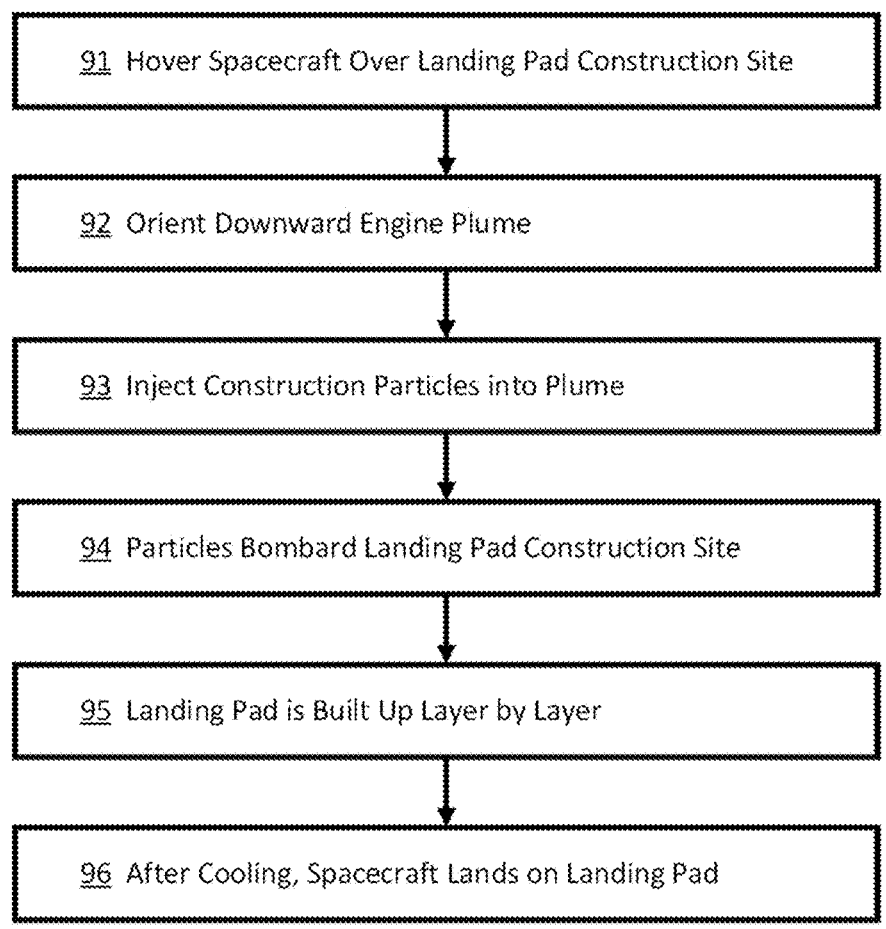
FIG. 4 is a flow chart of a first example method of constructing a landing pad during a hover.

FIG. 4 details high-level method steps of a first exemplary method for deploying a landing pad according to the invention. Before initiation of the landing pad deployment method, the spacecraft takes the normal steps prior to landing, such as a deorbit burn, breaking and selecting the landing location. Step 91 involves hovering the spacecraft over a landing pad construction site. This hovering can be done in place or as part of a slow descent or other maneuver. In step 92, the rocket engine plume is pointed toward the surface where the landing pad is to be constructed, also known as the landing pad construction site. In step 93, the landing pad construction particles are injected into the rocket engine's plume. The particles absorb the heat of the rocket engine while in the plume and are then projected at high velocity towards the landing pad construction site, where they bombard and contact the surface at step 94. This process continues through step 95, where the landing pad is built up layer-by-layer until it reaches a desirable thickness. The landing pad remains hot immediately after step 95, but the landing pad's thin composition and the extremely cold surrounding temperatures will cool the landing pad quickly. In step 96, once the landing pad cools off enough for the spacecraft to land, the spacecraft lands on the landing pad. Step 96 is optional and need not be included in all embodiments, as a landing pad can be created without a spacecraft landing on it. For example, this process could be repeated multiple times without landing to build a spacecraft parking lot comprising adjacent discrete or continuous landing pads. Additionally, a continuous landing pad could constitute a road or a tennis court in an early settlement without much infrastructure. Or, a nonporous landing pad could be used to coat a small crater and construct a liquid reservoir.

Figure 5A:
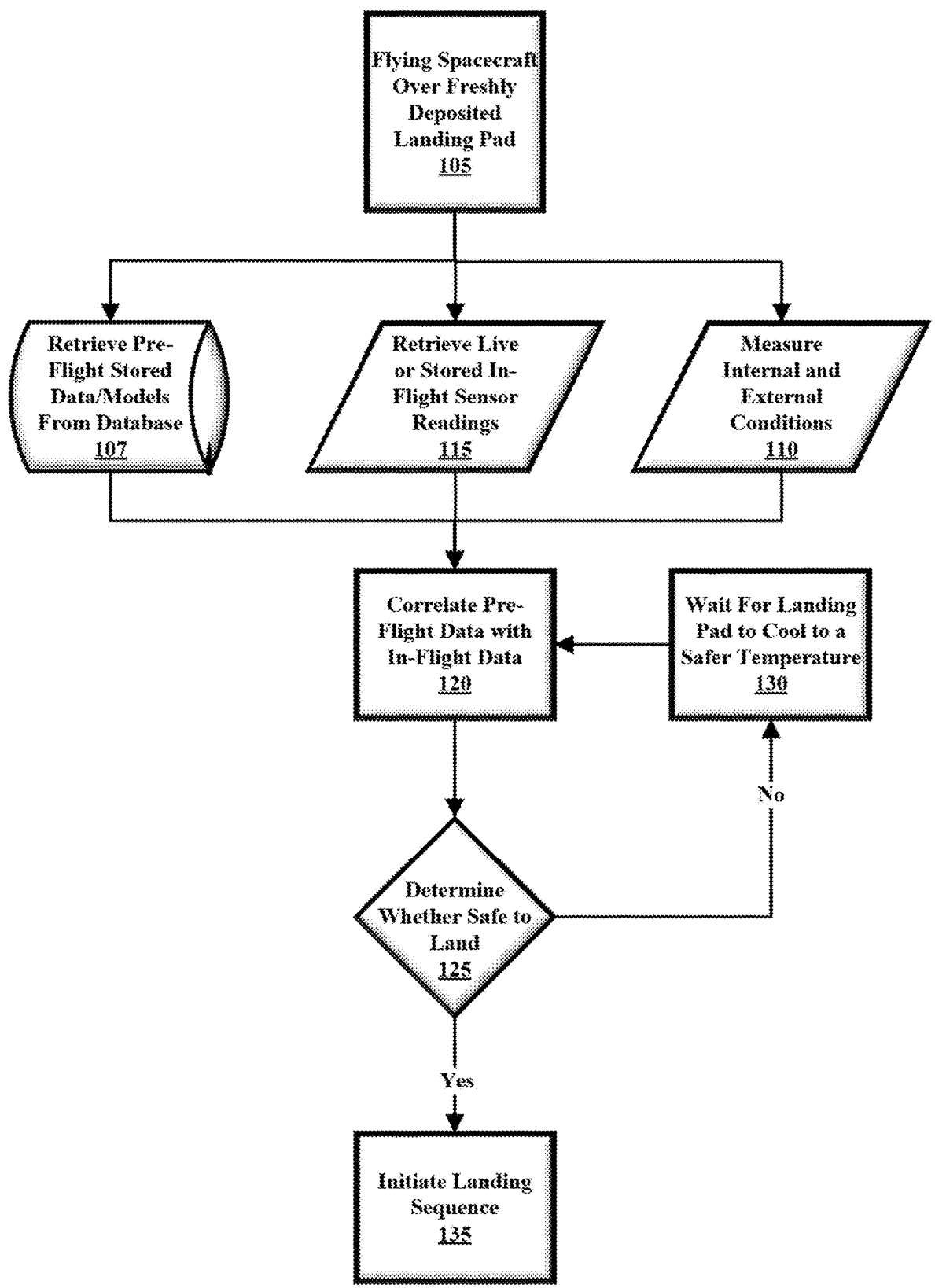
FIG. 5A is a high-level flow chart of an example method of determining when it is safe to land on a temporally unsafe landing pad.
Figure 5B:
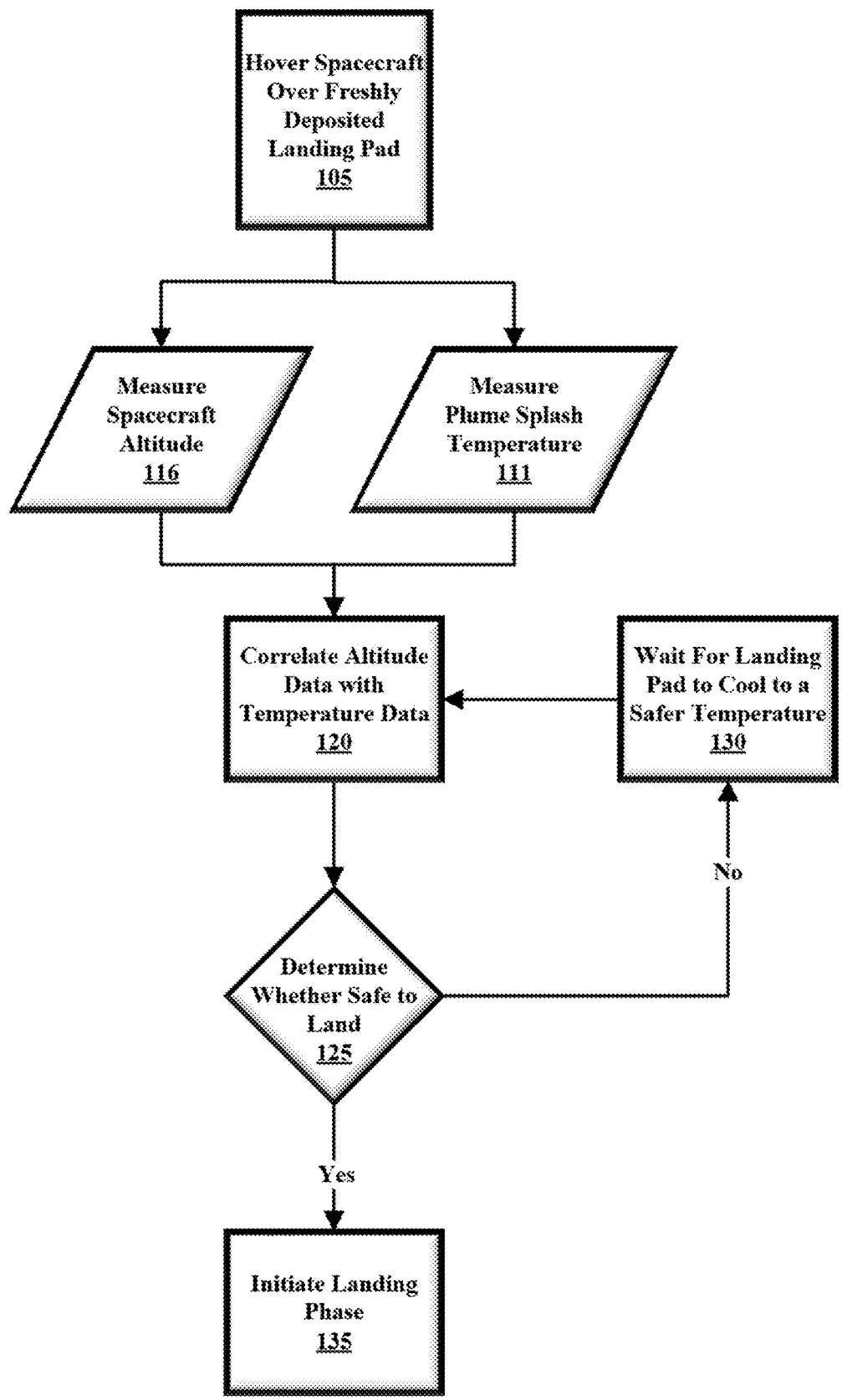
FIG. 5B is a flowchart of a specific instance of a measurement using altitude and plume splash temperature within the method of FIG. 5A.

Between step 95 and step 96 of FIG. 4, FIGS. 5A and 5B are flow charts illustrating optional steps which may be used in certain example embodiments to determine when it is safe to land the spacecraft on the landing pad. Step 105 involves hovering a spacecraft over a hot landing pad, wherein the landing pad is still hot from its recent deployment. At step 125, a determination is made of whether the spacecraft may safely land, and, upon an affirmative determination, the landing sequence is initiated at step 135. Between step 105 and step 125, data is collected and calculations are performed to inform the determination in step 125. The data can come from preflight stored data 107, in-flight sensor readings 115, or measured internal and external conditions 110. The latter two items are in-flight data. Step 120 involves correlating the preflight data with the in-flight data. Next, the method proceeds to step 125, at which point the spacecraft or its operator determines whether it is safe to land. If it is not safe, the spacecraft may wait (e.g., by hovering in place or slowing its descent) at step 130, so that the landing pad can cool, at least until additional data fed into step 120 causes a new affirmative determination to be made at step 125, verifying that landing can be performed safely. FIG. 5A is a higher-level model of this logical progression, whereas FIG. 5B describes a specific example. In FIG. 5B, steps 111 and 116 (which correspond to steps 110 and 115 in FIG. 5A) involve taking two measurements, the altitude of the spacecraft and the plume splash temperature. The plume splash temperature can be measured from the bottom of the spacecraft using a thermal sensor such as a pyrometer or IR CCD. In step 120, the measurements of steps 110 and 115 are correlated to facilitate determination of the spacecraft's ability to land safely on the landing pad, which occurs at step 125. If it is not safe land in the landing pad, step 130 involves waiting for a period of time until the landing pad cools to a safe temperature. Steps 110, 115, and 120 are repeated as needed to check whether the landing pad has cooled to a safe landing temperature. This process is repeated until the landing pad reaches a safe landing temperature. Ultimately, upon reaching a safe landing temperature, the spacecraft can initiate the landing phase in step 135.

The steps of FIGS. 4, 5A and 5B can occur at any time. Because shadows can have a sharp edge corresponding to a temperature difference as well as light sensitivity, if relevant, a more consistent landing pad can be deployed when the method steps are performed while the light or the shadow is consistent across the landing pad construction site.

Figure 9:
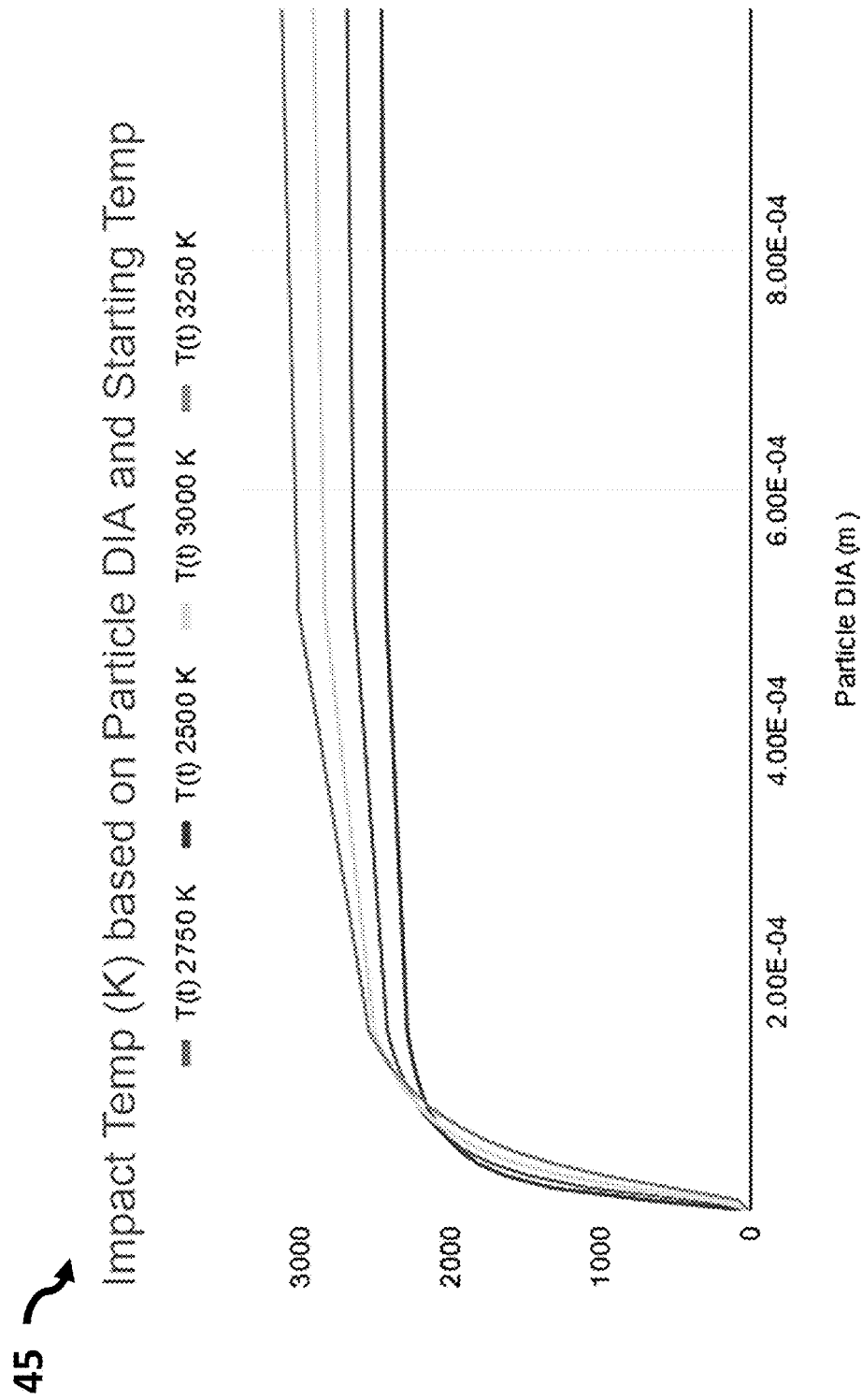
FIG. 9 charts a model of the surface impact temperature of particles based on the usual particle diameter and the temperature on exit from the nozzle of the particles from the combustion engine of the spacecraft.

FIG. 9 shows a chart 45 modeling the impact temperature based on the starting inputs of particle diameter and starting temperature (nozzle exit temperature) at a fixed altitude of 16 m—this corresponds to the low range of deployment altitude for an Apollo-style lander. As this chart shows, larger particles require a higher starting temperature to get to the same impact temperature but then retain their heat better than small particles. After a certain magnitude of starting temperature, the impact temperature becomes inelastic to increases in starting temperatures. The use of the word "diameter" in this specification does not imply that the particles must be spherical particles and should not be in any way limiting vis-a-vis the shape of the particle. For example, a particle with a diameter of 1 mm could be hexagonal prism shaped. The "diameter" is the average span from one side of a particle to another side of a particle. Similarly, when a particle's "size" is stated as a length measurement herein, that "size" refers to its "diameter," acknowledging the reality that the particle has a volume that is likely proportional to a cube of this number.

The viscosity of the chosen landing pad construction particle 10, when melted, is another factor to be considered because viscosity may determine the particles' properties at impact and during solidification. At a given particle velocity and temperature, a higher viscosity will be slower to yield to the surface, while a lower viscosity will yield more quickly and is more likely to create splattering.

In most situations, the spacecraft's instructions will be programmed into an onboard computer to automatically perform the steps in FIGS. 4, 5A and/or 5B. In some cases, the spacecraft can be controlled remotely if communication signals can be readily received. Alternatively, humans, computers, or robots in the spacecraft could control the deployment by inserting themselves at specific steps. Rigorous modeling and lab testing can be used as inputs in in-flight actions and decisioning as well as a machine learning and artificial intelligence system that can use sensor data in real time to optimize the landing pad deployment and landing. As shown in step 107 of FIG. 5A, pre-flight models can be retrieved and used. By way of example, a machine learning model such as a neural network can be trained using inputs to in-flight terrestrial spacecraft landings and landing pad cooling conditions, and the model can be additionally trained with prior-flight or real-time lunar, planetary, or other celestial body landing conditions, to predict safe spacecraft and landing pad parameters on the Moon or another celestial body. In this way, studies of the landing pad cooling histories and known environments will inform the spacecraft actions in newer environments. Then, the model can be used as an input in FIG. 5A to help determine whether it is safe to land at step 125.

The deposited layers of a landing pad may change in properties as the landing pad is built. The energy requirements will change based on the spacecraft. In one example, a spacecraft's engines are fired at a first stage, full throttle, to glassify the regolith and deposit a first layer of landing pad particles and then fired at a second stage, a reduced throttle, or using a separate particle feed size to deposit a second layer of the landing pad particles. In another example, the first stage for the surface/pad interface layer can be performed at a low throttle setting so that impacting particles are solid and at low velocities such that they do not form disk splats on contact with the surface. This will result in compaction of the surface and embedding particles in the upper regolith layers. These particles build up in thickness, resulting in a graded structure which transitions from regolith to the deployed particles. The compression will make the pad stronger by minimizing flex of the material during landing. In this example, the spacecraft's engine may then throttle up to transition to the primary pad deployment phase, which deposits the material over the transition layer.

Base Layer

The first layer of particles impacting the regolith will partially melt and adhere to the regolith layer to create a hybrid binding layer that bridges the gap in the grain size of the melted regolith with the grains of the landing pad for added flexibility. For example, the spacecraft can shoot high velocity landing pad construction particles at the surface to compress and glassify the surface by making microscopic impact craters. This thin glassified layer is formed by impacts particles traveling at 1+km/s velocity. As this thin glassified layer forms, it serves as the interface layer between the regolith and the landing pad, as the rough glass surface should allow better adhesion of the pad layers. Then, at slightly lower energy (either via lower velocity or lower mass), the landing pad construction particles will accrete to reach the needed pad thickness.

The spacecraft can deploy particles at higher velocities and altitudes where the particles are solid on impact. The high velocity transfers the particles' kinetic energy into heat, which melts the particles and helps them adhere to the surface.

The spacecraft can also utilize the impact energy of the particle to glassify the regolith to create a landing pad without further deposition of particles. A landing pad formed by this glassification-only method would be very thin and rough, and may be primarily useful for developing a solid surface on which to build future landing pads or other structures.

Additionally or alternatively, a base layer of a different composition or different particle sizes from the main landing pad material can be used with the landing pad. It may be possible to use larger landing pad construction particles in the initial layer to help match or bridge the granular gaps between the regolith. Or, in another example embodiment, an entirely different material can be loaded through the engine and separately dropped onto the site.

Ultra-Low Gravity and Sensitive Temperature Surfaces

The methods described herein should work equally well in both vacuum and atmospheric environments, but each of these environments may require different optimization techniques or parameters. In addition, the cohesive effect of a thin coating may hold surface particles in place when landing on ultra-low gravity surfaces, such as those present on Ceres, Phobos, or asteroids. Porosity of coating can be added and controlled, thereby improving thermal barrier at the expense of structural integrity. The spacecraft could land and take off for return to orbit with the pad maintaining enough structural integrity to also mitigate plume effects on ascent. Therefore, this type of landing pad enables new missions.

The deposition temperature on the surface can be well controlled. By Applicant's calculations, the surface temperature can be maintained at less than 100° C. This can enable missions to land on sensitive surfaces, such as Europa's ice crust.

Landing Pads Created in this Manner have Other Benefits.

Landing pads created in this manner can realize other unforeseen benefits. First, a lander could land in relatively close proximity to other surface assets without pre-existing infrastructure, which greatly expands potential landing locations and minimizes the need for pad construction. Without entrained regolith, the deflected plume does not pose a risk to nearby landed assets. The regolith coating application is applied by the plume, which only affects areas of the surface where impingement takes place, allowing a mass-efficient system which does not contaminate the surrounding area or nearby science objectives, existing infrastructure, or heritage sites. The thickness and material properties of the pad are based on the size and temperature of the landing plume and can be optimized to meet a diverse set of missions.

Second, current processes of landing on the Moon create ejecta and low orbit disturbances that can hamper science experimentation. The methods for constructing landing pads according to this invention allow for more naturally occurring and representative particle size distribution of regolith in proximity to a landing site. This benefits scientific experiments and analyses of the soils.

Third, this technology helps to protect human heritage in outer space and on celestial bodies, in accordance with Section 9 of the Artemis Accords, by reducing the amount of ejecta that might otherwise threaten the integrity of historically significant human and robotic landing sites, artifacts, and spacecraft.

Several factors, such as atmospheric conditions and wind, could scatter or otherwise redirect particles after they leave the rocket engine's nozzle. The amount of scatter must be taken into account when considering nearby surface assets or scientific experimentation that could be damaged by high velocity landing pad construction particles missing their intended target. Under lower scatter conditions, the landing pad can be constructed closer to the nearby surface assets or scientific experimentation.

In order for the alumina particles to have a disc splat shape, they must be hot enough and impact the surface fast enough to deform without significant splattering. The deposition particles impact the surface at ballistic velocities to conform and adhere to the surface at the landing pad construction site. If the particles are too hot, they may splatter. If the particles are too cold, they may bounce off of the surface or embed too deep in the regolith. A continuum exists between too hot and too cold that would create surface impacts of different shapes.

Besides temperature, the impact type and shape may depend on the angle of impact, as well as the speed of impact, the material of the landing pad construction particles, the surface being impacted, and other factors. A person skilled in the art can optimize the factors to construct a working balance of landing pad strength, particle cohesion, flexibility, density, and surface fracture toughness for a particular spacecraft on a particular mission. The velocity of particle impact may be affected by the spacecraft's height over the landing pad construction site, the engine settings and plume characteristics of the spacecraft, the atmosphere or the lack thereof at the landing site, the particle size, type, statistical variation, and shape, the angle of impact, and other factors.

"Ballistic", for the purposes herein, means a high-speed projectile that is not limited to gravitational pull. "Particle", for the purposes herein, except in context with regolith composition, refers to landing pad construction particles 10. The term "particle" does not only refer to solid state materials. The landing pad construction particles may at least partially melt while in the rocket engine and its plume, and such materials would still be considered "particles," regardless of their phase.

The "surfaces," also referred to as "substrates," "regolith," or "ground," on which landing pads can be deposited include, but are not limited to, the surfaces of planets, moons, comets, and asteroids. The subject matter herein enables a spacecraft to land on an unimproved surface with significantly decreased risk of ejecta damage and lack of visibility due to dust at the landing site.

On the spacecraft are one or more hoppers of the feedstock, referred throughout as landing pad construction particles, are able to be fed or injected into one or more engine's plumes on the spacecraft. An injection site is within the rocket engine, and in an example embodiment, is downstream of the throat in the nozzle. Other injection sites may be able to be used. For longer missions, the weight of the hoppers and the landing pad construction particles need to be minimized as unnecessary weight is very costly.

Figure 10:
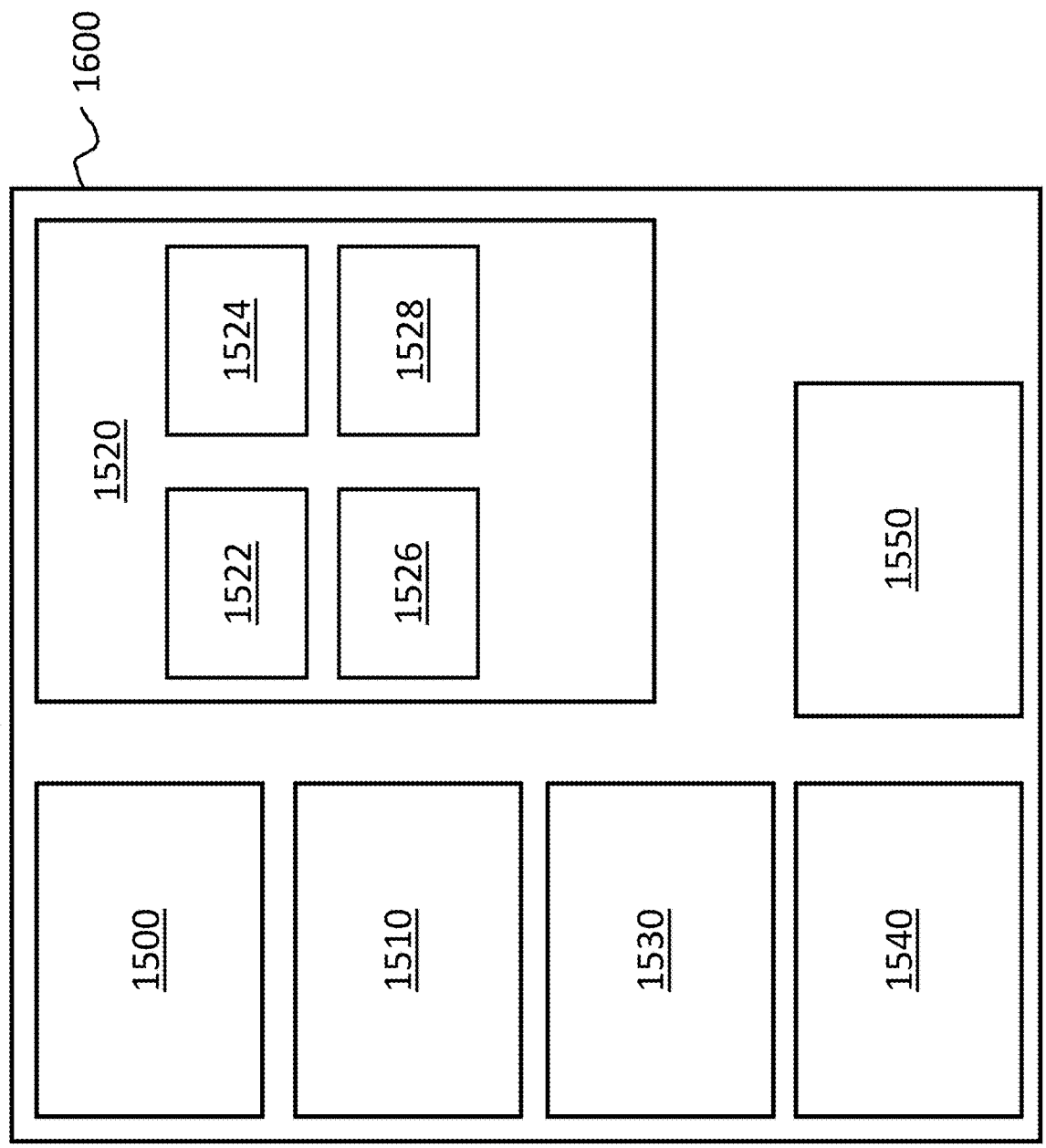
FIG. 10 is a chart of the computer hardware components of an exemplary system for controlling the landing pad and landing systems and sensor module of a spacecraft.

FIG. 10 depicts an exemplary computer for controlling the landing pad system and methods. The computer 1600 includes a processor 1500, a computer readable storage medium 1510, an landing pad systems and landing controller module 1520, random access memory 1522, an engine control link 1524 for controlling the throttle and propellant input in the engine, an engine gimbal system link 1526 for directionally controlling the engine's plume, a hopper control link 1528 for controlling the injection of landing that construction particles, remote communications module 1530, and sensors module 1540 containing a thermal sensor, thermal camera, sampling systems, and an altitude sensor among other sensors on board the spacecraft. Data storage 1550 stores preflight and in-flight information used in the landing pad construction and landing processes herein. A system-wide bus (not shown), input/output components (not shown), and present and future arising terrestrial and space communication technologies provide communication linkage between the various components and external communications sources.

Sensors and Measurements

Beyond the deposition itself, the spacecraft can benefit from being able to sense in-flight what is happening below and answer questions like "is it safe to land?" or "is the landing pad structurally sound?" or "how thick is the landing pad?" or "what is the diameter of the landing pad?" or "where on the landing pad should the spacecraft land?" or "was the landing pad deployed over an unstable surface?" The space environment in combination with engine plumes between the landing pad and the spacecraft presents challenges to the collection of perfect data to assist in answering such questions. However, the use of sensors can help provide enough information to determine actionable answers to some of these questions. The spacecraft can be programmed to determine whether it is safe to land based on data collected by a variety of sensors that can comprise the sensor module 1540.

When the deposition is not occurring, LiDAR and other laser-based systems or RADAR can make a scan of the topography of the surface. Measuring the topography of the baseline of the surface without a landing pad relative to measuring the surface with the landing pad can help to estimate the landing pads thickness (at least that above the surface).

A LIDAR system or laser rangefinder can provide pre- and post-deployment topography to enable thickness calculations. The LiDAR types in example embodiments include scanning LiDAR or flash LiDAR. However, LiDAR and laser-based systems do not react well in plume environments. An example embodiment herein uses a thermal sensor as a light and low-cost mechanism to collect data. The spacecraft can use the thermal sensor, pointed down towards the surface, to detect plume splash against the surface, correlate the temperature to altitude, and enable secondary input to provide a shut-down signal to the spacecraft's engines. Thus, the spacecraft can determine when it is safe to land on a landing pad or a regular surface. A hot landing pad freshly deposited according to the methods described herein could damage the spacecraft or its cargo, crew, or passengers.

A spacecraft according to the present invention may comprise sensors in its particle hopper or at its injection site(s) to determine quantities of remaining or injected particles and/or whether other faults exist.

In addition, the temperature of the landing pad captured by the thermal camera can be used to estimate the hardness and the strength of the landing pad. Through detailed studies and/or models of the depositions of other landing pads, knowledge of the surface temperature of a freshly deposited landing pad can be used to calculate the temperature of the internal pad and therefore the total pad strength and mechanical properties. Additionally, the surface temperature can be used to determine cooling time based on a preflight built model of the system, which will inform the spacecraft how long it must hover before landing.

Some landing pads may be naturally reflective based on the type of landing back construction particles and the deployment parameters. Additionally or alternatively, reflective tracer particles such as magnesium particles can be added to the landing pad or specific layers thereof to enhance the reflectivity or create light independently through tracer rounds. These tracer rounds will burn hotter and brighter than the other particles and will continue to do so as they exit the plume. An optical camera can measure the reflectivity and use these measurements to estimate the buildup of the landing pad.

At extremely low deployment altitudes, especially ones where ejecta would be kicked up by the plume, measurements can be taken by the thermal sensor of the plume to understand how it interacts with the landing pad below.

Porosity of the landing pad, which can help establish a thermal barrier between the engine plume and the surface in environments that are temperature sensitive, can be approximated by engine properties during deployment, the type of regolith, and the altitude of deployment. This data enables calculation of the impact and split model for the pad buildup. This could be done based on modeling equations or via pre-built lookup tables.

Other Layers and Repairs

The landing pad can still work for its purposes with some amount of ablation, erosion, cracking, scratching, or spalling on its surface, provided it still functions to minimize ejecta. Additional protective layers may be added during initial landing pad deployment or after the spacecraft lands.

An optional embodiment of the landing pad could have a char layer in addition to the layers created from the landing pad construction particles. Similar to a spacecraft's exterior surface protective tiles that fail slowly during reentry, it may be possible to deposit one or more char layers that are self-healing on the top of the landing pad to protect the landing pad from cracking or sustaining other damage due to the high temperatures of the engine plume, scratches made during landing of the spacecraft, or the impact of flying ejecta. The char layer would ablate into the cracks and other surface defects. An alternative embodiment to a char layer is a carbon-carbon coating that can absorb the heat of the engine plume. Another alternative embodiment to a char layer is a spray-on ablative cork coating. The cork can be mixed together with or suspended within a matrix of the coating.

Such additional layers do not have to be formed through the main combustion engine. For example, the spacecraft could add a drying liquid onto the hot, freshly formed landing pad while inflight, or a new layer can be added after the first landing to increase the landing pad's useful lifespan. In a vacuum environment, a material could be sprayed such that, after contact with the surface, the volatiles present would offgas, leaving behind a matrix of regolith and binder to create a composite landing pad. The drying liquid and the volatiles in the above methods would be chosen based on the needs of the specific landing pad and the conditions of the surface.

Patches may be used to repair a used landing pad. This can be done by adding new landing pad construction particles to a damaged area of the landing pad, and briefly refiring the combustion engine or applying an external heat source to melt or sinter the particles in the damaged area. Additionally, reinforcing fibers can be placed across the damaged area prior to the heating step so that the particles and fibers together form a more mechanically robust patch. Alternatively, materials other than the landing pad construction particles can be used for a patch, such as metals or thermally sintered regolith.

The methods described herein could also be used to refresh an existing landing pad. The existing landing pad could have fresh layers added on top by the methods disclosed herein or its top surface could be modified. For example, on a dusty surface, it is possible that layers of dust accumulate on an existing landing pad over time. Freshening up the top of the landing pad with new layers could prevent unwanted dust ejecta.

Regarding injection timing, continuous injections, timed or variable intervals of injection and non-injection, variable injection amounts over time, pulsed injections, or any combination of these are all possible. This injection timing may be combined with multiple injectors having potentially different landing pad construction materials, different spacecraft heights and velocities, different propellant/plume levels, thus yielding numerous permutations from which the operator may choose, thereby allowing for a complex control environment.

As the spacecraft positions over or proximate to the landing pad construction site, the spacecraft could descend from the initial hover while the coating is deposited as both an optimization variable and as a way of minimizing lost deposition material. Instead of starting from a hover, a spacecraft can start in a slow descent or other motions with a combination of tangential and vertical velocity with the plume facing the landing pad construction site. If certain surfaces or landing pad construction particles require more cooling time between layers, the spacecraft may incorporate other motions or injection timings.

Regarding orientation, in an exemplary embodiment, the injection of construction particles begins with the plume already oriented toward the ground, even if it is started prior to reaching the landing pad construction site.

Because time is precious on a spacecraft, there may exist a tradeoff between coating quality and application time.

The benefit of the heated landing pad construction particles impacting an unimproved surface at ballistic velocities is that they can bind unimproved surface particles together at an individual grain scale to increase cohesion. In addition, the landing pad is built up layer-by-layer to achieve an ablation-resistant coating on the surface. The landing pad can be resilient enough to survive at least one descent (i.e., landing) and ascent (i.e., liftoff) cycle. The landing pad can also redirect or deflect the impinging plume away from the lander to minimize ejecta. The landing pad only affects areas of the surface where impingement takes place and therefore does not contaminate the surrounding area including nearby science experiments or observations taken place. "Unimproved surface" refers to a surface that has not been modified, such as the regolith or a rocky or icy surface of a moon, comet, asteroid, or planet.

Because the surface can usually physically support the spacecraft on its own, the infrastructure of the freestanding built landing pad is wasteful when the application does not demand it. The methods herein are able to create a mass-efficient landing pad construction that prevents plume impingement and the resulting ejecta while using relatively minimal materials that can be carried on the spacecraft without interfering with other mission objectives.

An advantage of the methods and systems herein is that adhesion can be achieved with loose or particulate soil or regolith conditions. In loose soil or regolith conditions, there exists an interface layer to provide adhesion between the base material and the landing pad. This is achieved through the use of lower velocity impacts of solidified material to compact the substrate via tamping, without providing enough impact energy to create much ejecta of its own. The amount of tamping and the thickness of the interface can be controlled by the particle size and velocity. As the particles impact and embed themselves into the regolith, they start stacking onto each other, increasing the concentration of the pad material. Once compaction has been complete to the needed level, the landing pad is then applied on top. The higher concentrations of compatible material in the interface layer aid adhesion and reduce thermal strain and residual stress in the landing pad during cooling.

Spray angle

FIGS. 6A and 6B are perspective illustrations contrasting two nozzles 30 at the same height $h_n$ creating two different sized landing pads 70 on surface 50 as a result of different spray angles θ. Spray angle θ measures the angle of spread of the particles out of the nozzle with respect to the center of the nozzle. Spray angle is measured from the perpendicular of the surface bisecting the nozzle to the outer line in FIGS. 6A and 6B. Spray angle θ may be influenced by injection location 20, nozzle geometry, engine design parameters, operating load, and other factors. Nozzle height $h_n$ is the distance from the spacecraft's nozzle bottom to the surface at the time of landing pad deployment. Nozzle height $h_n$ approximates how far the landing pad construction particles 10 travel from the injection site through the plume 32 to the surface 50.

For example, in a vacuum environment, the speed at which the particles hit the landing pad construction site is at ballistic velocities because there is no friction with atmospheric gasses. This means depositions through a wider nozzle angle may still adequately deposit into a dense landing pad. In contrast, under atmospheric conditions, it could be harder to achieve such high deposition speeds, and less angle, e.g., <2%, will be allowed to achieve a dense landing pad.

In situations where a tight (i.e., small spray angle θ) plume is required and such a spray angle θ does not match the main engine's characteristics, a smaller secondary thruster may be used to create a smaller diameter landing pad. Additionally or alternatively, other spraying angle reducing techniques such as adjusting throttle, a mechanical system to reduce the effective nozzle flare, or a vapor barrier circumferentially injected into the nozzle may be used to create the smaller diameter landing pad. The spacecraft of FIG. 1 is shown with four rocket engines with relatively tight plumes (small spray angle θ) on a lunar landscape (vacuum conditions) depositing a landing pad. This configuration would be effective in atmospheric conditions as well. Even if a landing pad is not deposited evenly, e.g., due to flight conditions or rocket engine/nozzle configurations, the landing pad still may be enough to provide relief by lessening the ejecta.

Spray angle can be influenced by many things. Injection points upstream or near the throat have less variation in angle. The nozzle shape and design can also impact spray angle. Narrow bell designs may enable tight arcs of less than 5° whereas wide vacuum nozzle bells can result in larger spray angles.

Landing Pad Diameter

It is important to consider the minimum size and requirements of a landing pad when so many constraints are present with a spacecraft's mission. A known landing pad failure mechanism is ablation of the landing pad as a result of the effects of the plume and the ejecta it creates. When this failure mechanism occurs, a keyhole-type punch occurs within the landing pad at the site corresponding to the plume. The minimum size of a landing pad created for the purpose of a landing spacecraft needs to be enough to materially minimize the plume effects that would cause the landing pad to fail by this mechanism. That is, it could be possible that the entire spacecraft does not fit on the landing pad, yet the plume area of the rocket engine is protected from the planetary surface (and vice versa). In addition, a smaller spray angle may yield a denser or thicker landing pad providing greater protection from the plume. The larger Artemis-style landers have a higher risk of damage from the ejecta they create than do the older Apollo-style landers, due to the relative power of the respective rocket engines and the type of cratering they cause. The landing pads herein can address these issues.

The benefit of a larger landing pad is ejecta prevention. By covering a larger area, the winds from the plume and the environment are less likely to kick up regolith when more area of the surface 50 is covered.

The lander shown in FIG. 1 has four combustion engines pointing towards the surface. While it may be possible to use 4 separate landing pads, one under each combustion engine, a larger diameter landing pad makes more sense in that scenario because there will be more wind and more plumes to deflect.

Landing Pad Shape

While a circular landing pad has been shown in the exemplary embodiments, other shapes are possible. For example, a lander's descent is not always perpendicular to the surface that is landing on. If the landing pad is deployed during a descent with both horizontal and vertical vectors relative to the surface, it is expected that the landing pad would be ovular, not perfectly circular. Additionally, the nozzle in most combustion engines is a bell-shaped cross-section creating a circular plume cross-section in the circular ovular landing pad as discussed herein. Other nozzle shapes or other plume constrictions could make it possible to form different landing pad shapes. In this context, the term "diameter" refers to the span of the landing pad from edge to edge regardless of whether the shape of the landing pad is a circle.

Coating Thickness and Density

With deployed dense and ablation-resistant landing pads on the order of magnitude of centimeters of thickness, deep cratering can be avoided while preventing most ejecta. Landing pads can also be deposited with variable thickness or density or other variable properties from the center of the landing pad and along its diameter. A perfectly thick or dense landing pad across its diameter may not always be the most efficient use of weight on a spacecraft. For example, the landing pad could provide additional protection for the plume area with extra thickness or density in the proximate areas of the landing pad while beneficially covering a larger surface with thinner or less dense regions of the landing pad for minimizing ejecta or other reasons.

FIGS. 7A-7C depict concepts that can be employed in exemplary embodiments of the landing pad from a single rocket engine with varying thicknesses of the center regions 250 relative to the edge regions 255. FIG. 7A depicts a top and cross-sectional view of the central region 250 and an edge region 255. FIG. 7B is the same FIG. 7A except that FIG. 7B depicts a different cross-sectional view of the central region 250 extending further into the surface then edge region 255 penetrates the surface 50. This is a result of intentional efforts to use a smaller spray angle and then a larger spray angle, or vice versa, or a combination of the two, to create the different thicknesses. This configuration may be beneficial due to wider dust protection from a larger diameter with stronger keyhole punch resistance. FIG. 7C is the same as FIG. 7A except that FIG. 7C depicts a cross-sectional view of a different landing pad variation wherein the central region 250 extends both below the landing pad and above the landing pad relative to the edge region 255. Note that the landing pad heights in FIGS. 7A, 7B, and 7C are not to scale relative to the diameter dimensions of the landing pad. Spray angle can be adjusted by throttling the engine, by introducing landing pad construction particles at different points in the throat or in the nozzle, by changing the propellant mixture, by following other ways described herein, or by following other known and future arising ways of varying the plume output of a rocket engine. Additionally, more than one engine can be used in a single deployment to vary the features across a larger landing pad. Due to things like spread angle and solar wind, where some of the edges of the plume are more likely to be affected than the center of the plume, there could be a natural concentration of landing pad construction particles in the center which would help make a thicker area directly below the combustion engine to prevent keyhole failures. While FIGS. 7A-7C are intended to illustrate the concept of variation in the central region 250, landing pad thickness may vary additionally or alternatively in edge region 255 or may have entirely different property profiles along its radius or thickness.

Figure 8:
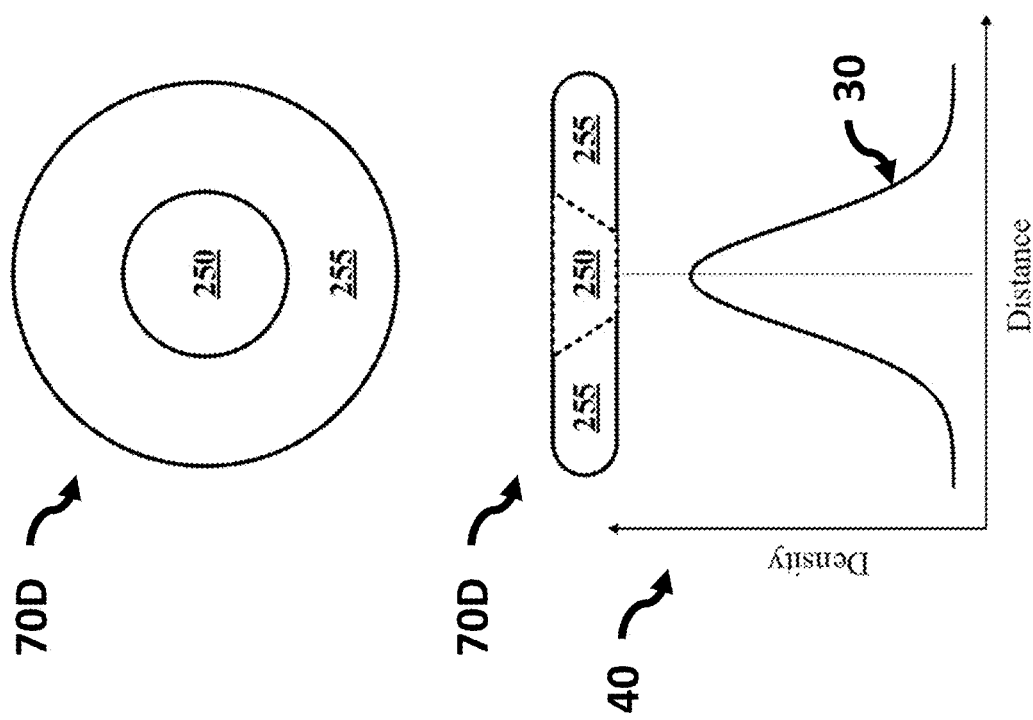
FIG. 8 depicts top and cross-sectional views of an exemplary landing pad having a central region with a higher density than that of its outer regions and a chart illustrating the density throughout the cross-section.

A similar concept but different effect could be achieved using a landing pad having a central area 260 which is denser than its edge region 265. This is shown in top and cross-sectional views in FIG. 8. Additionally or alternatively to varied thickness, density can be used to optimize the balance between keyhole punch resistance in the central area 260 in general landing pad size based on the diameter through the edge region 265. Thickness and density could also be exchanged for other materials properties that may be adjusted using different engine/booster configurations and methods of deposition.

There may be other situations where the weight of a spacecraft at its edges is an important consideration that could cause failure of an entire landing pad, where strengthening the edge regions together with or separate from the center region may be beneficial.

Figure 12:
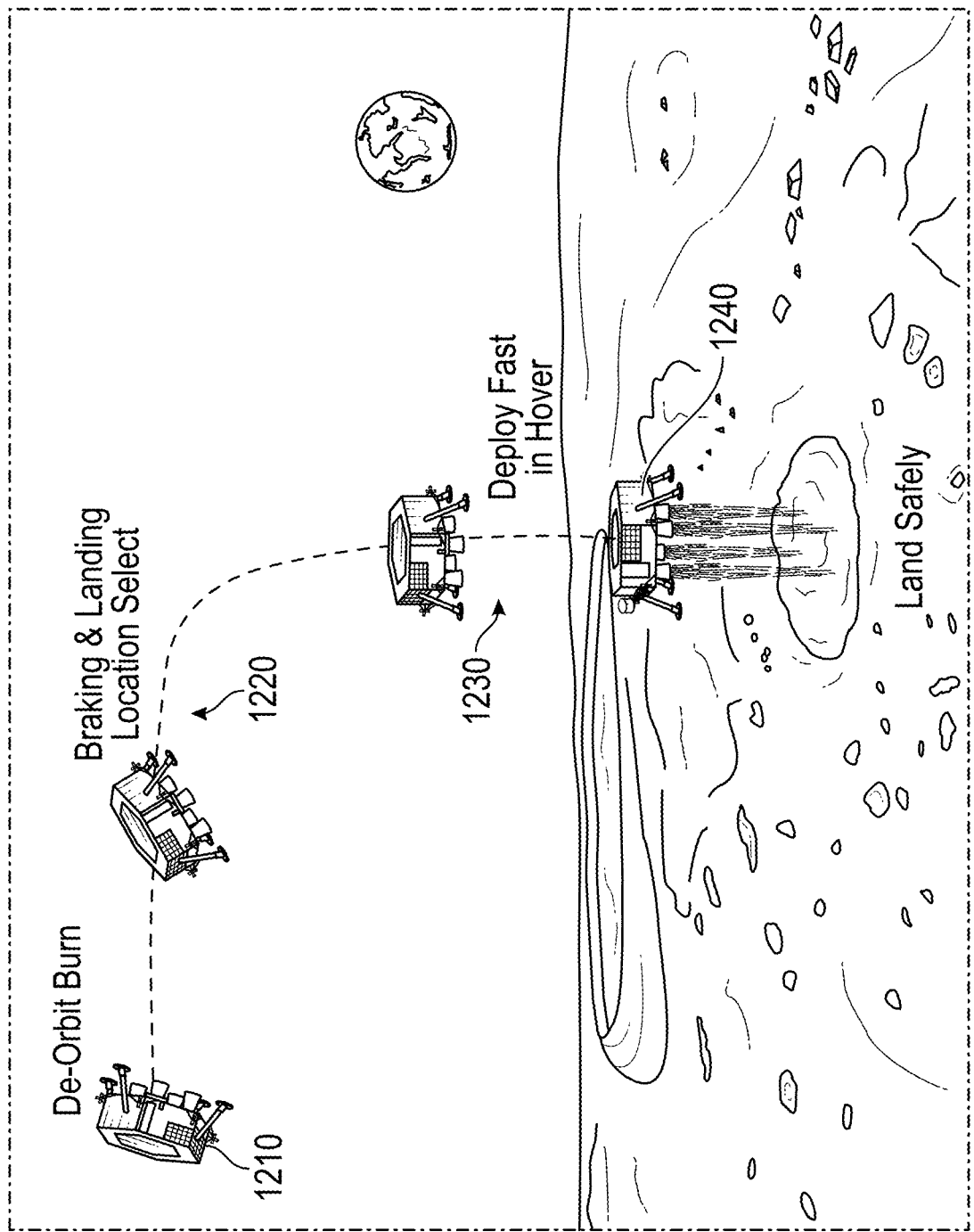
FIG. 12 depicts an example flight path of the spacecraft from orbit through landing pad deposition until landing safely.
Figure 13A:
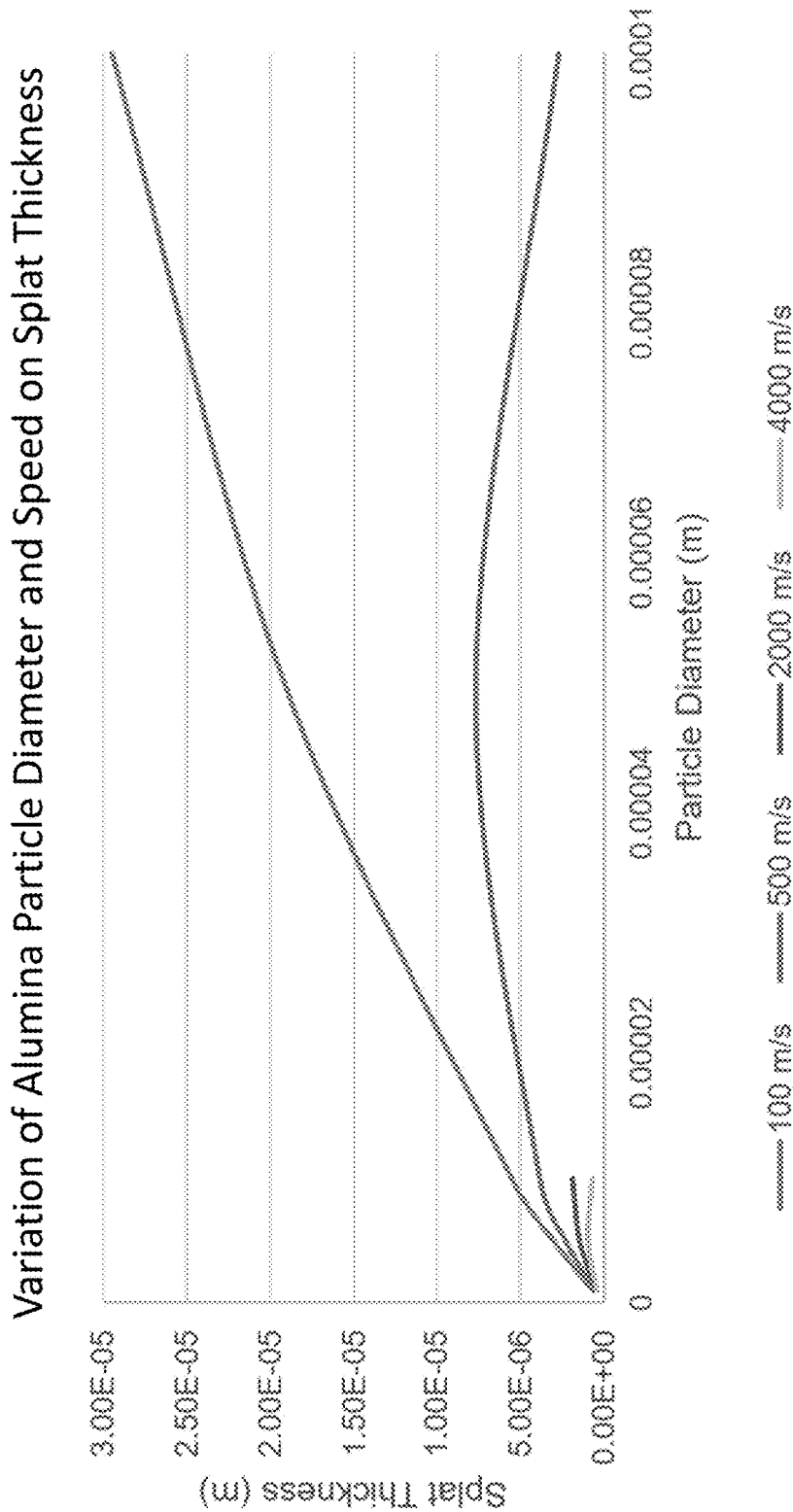
FIG. 13A charts a model depicting the variation of particle diameter and speed on splat thickness.
Figure 13B:
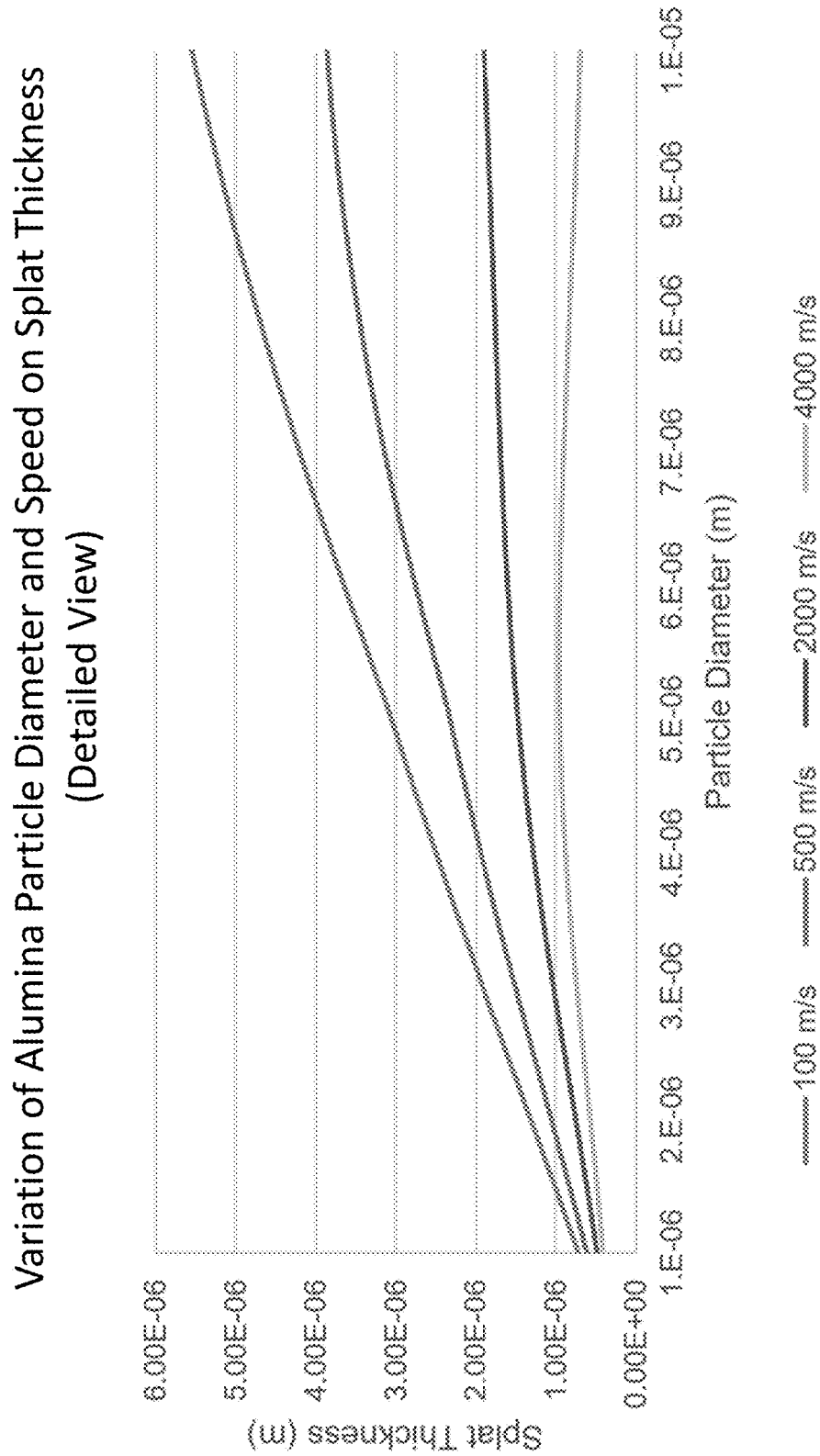
FIG. 13B charts the same model in a more detailed view.

FIG. 12 depicts an example flight path of the spacecraft from orbit through landing pad deposition until landing safely. In this example, step 1210 is a deorbit burn where the spacecraft is coming in at an angled trajectory relative to the surface. Step 1220 involves the spacecraft braking and selecting a location upon which to deposit a landing pad and land. Step 1230 entails deploying the landing pad while in a hover over the surface. For example, step 1230 can implement the method of FIG. 4. Step 1240 involves landing the spacecraft onto the landing pad in a safe manner. For example, step 1240 can implement the methods of FIGS. 5A and 5B. This flightpath is a non-limiting example, and other flight paths are possible.

EXAMPLE 1

An example landing pad deployment altitude is 50-100 m above lunar regolith with a maximum particle velocity of 4500 m/s. The projected alumina particle mass for a lander having dimensions comparable to the Human Landing System (HLS) landers under development for the Artemis program is approximately 25-45 kg during deployment with a 10-20 second hover, resulting in a landing pad about 0.3-0.6 centimeters thick in the center. After deposition, the lander will allow the landing pad to cool and then will land. A second example for a lander with lower thrust engines could deploy at an altitude of 10-25 meters and use non hydrogen fuels resulting in particle velocities around 3000 m/s. The projected alumina particle mass would be less, in the 15-30 kg range, with a 5-10 second deployment and a pad thickness of 0.1 to 0.25 mm. After deposition, the lander would be able to land on the pad in less time, after approximately 10 seconds of cooling.

EXAMPLE 2

An example deployment altitude is 60-100 m of an HLS-type lander in an ultra-low gravity environment. Projected alumina particle mass is 20 kg during deployment with a 30-60 second hover, resulting in a porous landing pad 0.3-0.6 centimeters thick.

EXAMPLE 3

Figure 11:
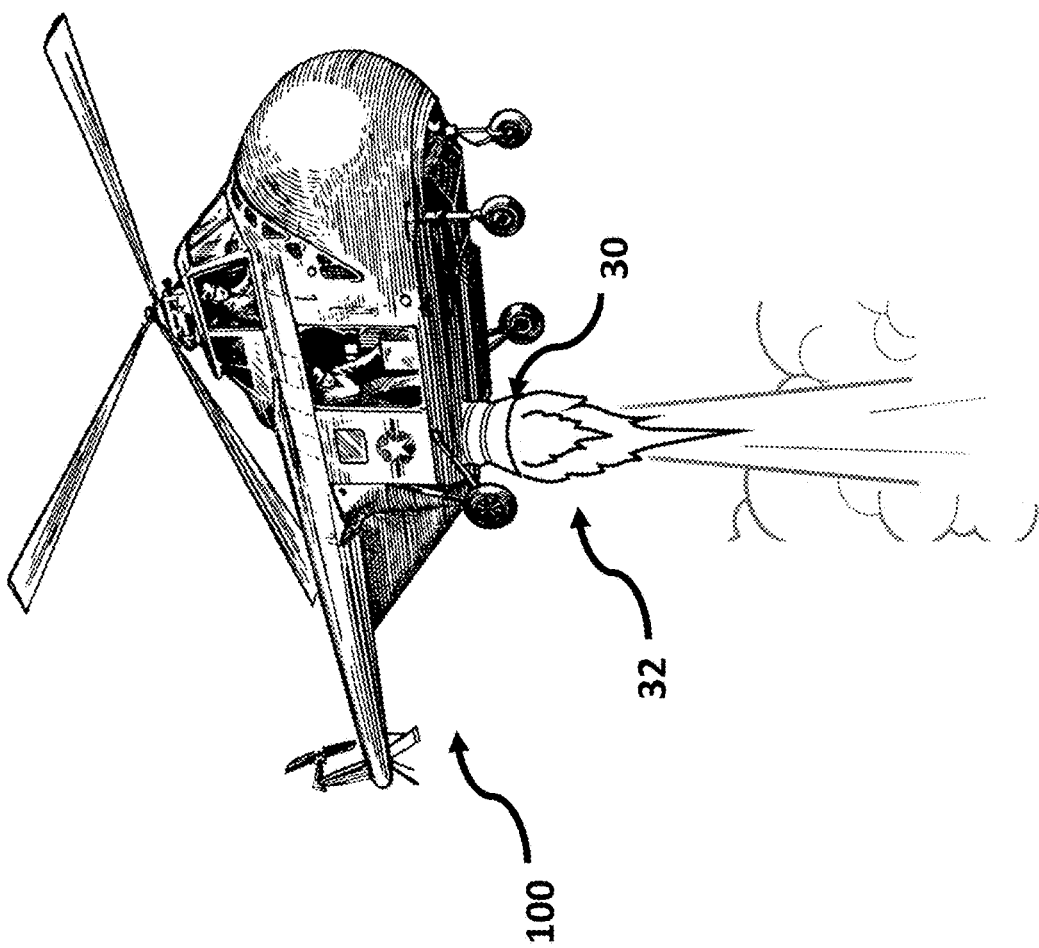
FIG. 11 depicts an example embodiment of a spacecraft (in this non limiting example, a helicopter), retrofitted with a secondary thruster that can be used for in-flight deployment of a landing pad.

An example deployment altitude is 25-40 m using a supplemental thruster on a helicopter over a sandy surface, as depicted in FIG. 11. Because the helicopter does not need to land using a vertical thruster, a wider diameter landing pad is desirable to prevent ejecta. In addition, the wind from the helicopter rotor(s) may cause more spread of the plume and variation of the particle dispersion during landing pad deployment. The supplemental thruster is set to the desirable throttle, and the landing pad construction particles of alumina are injected into the thruster plume through the injection point in the nozzle. The projected ceramic cumulative particle mass is 10 to 20 kg, and results in a landing pad about 0.25-0.40 centimeters thick.

EXAMPLE 4

In accordance with the diagrams shown in FIGS. 6A and 6B, a spray angle of 4 degrees can be used to determine the approximate landing pad size generated. According to geometry the landing pad diameter is tan (4 deg)=pad radius/nozzle height. This will be used to generate material volume required, and thus mass of the system. Material volume is the area of the landing pad, solved from the diameter, multiplied by the thickness. Nozzle height (deployment altitude) will be high enough to prevent the plume from deep cratering on the regolith or injecting too much fluid pressure, soil instability, or ejecta into the system to prevent the formation of a landing pad. As a quick calculation, an example landing pad has a mass of 26 kg for a 1-meter diameter landing pad with a 1-centimeter-thick coating, is 6670 cm$^3$, with alumina at a density of 3.95 g/cm$^3$. This amount could be carried aboard the spacecraft in powder form.

Unless otherwise defined, all technical and scientific terms used herein have the same meaning as commonly understood by one of ordinary skill in the art to which the claimed features belong. Moreover, Applicant's inconsistent use of a term should not be construed as different terms unless defined by Applicant or the context. Although methods and materials similar to or equivalent to those described herein can be used in the practice or testing of the landing pad construction and lending thereon, suitable methods and materials are described above. All publications, patent applications, patents, and other references mentioned herein are incorporated by reference in their entirety to the extent allowed by applicable law and regulations. The landing pad and methods of manufacturing the landing pad may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Other objects and advantages of the various embodiments of the present invention will become obvious to the reader, and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Any headings are not intended to be construed as limiting the subject matter that follows, nor are they to be construed as the sole place where subject matter falling under the heading is discussed.

There have thus been outlined, rather broadly, some of the features of the landing pad and method of constructing the landing pad in order that the detailed description thereof may be better understood, and in order that the present contribution to the art may be better appreciated.

It will be apparent to those skilled in the art that various modifications and variations can be made to the disclosed methods, systems, software, hardware, materials, and components herein. Other embodiments will be apparent to those skilled in the art from consideration of the specification and practice of the disclosed inventions. Numerous modifications, changes, variations, substitutions, and equivalents will occur to those skilled in the art without departing from the spirit and scope of the claimed invention. It is intended that the specification and examples be considered as exemplary only, with a true scope being indicated by the claims, as later amended, and their equivalents. The benefits, advantages, solutions to problems, and any element(s) that may cause any benefit, advantage, or solution to occur or become more pronounced are not to be construed as a critical, required, or essential features or elements of any or all the claim, unless asserted as such by Applicant's remarks in the record. Accordingly, the specification and figures are to be regarded in an illustrative rather than a restrictive sense, and all such modifications are intended to be included within the scope of the claimed invention. Likewise, it is to be understood that the phraseology and terminology employed herein are for the purpose of the description and should not be regarded as limiting.

Regarding additional interpretation and construction of terms and steps herein, method steps are not in any specified order unless dictated by the context or specific wording. In addition, a use of a word in the singular form should be interpreted where the context allows, or does not restrict, so as to enable plurality or an "at least one" construction. Positional and directional terms described in this specification may be understood to be different than shown or described, and should not limit the variations of embodiments possible from the claimed features that a person of ordinary skill in the art would understand from the specification, figures, and claims. The term "and/or" in a list means all list items present, some list items present, or one of the list items present, unless such construction is limited by the context.

INDUSTRIAL APPLICABILITY

In addition to the goals stated above, the system, apparatuses, and methods herein can be used to build landing pads and other features on unimproved surfaces, including creating landing pads during flight or descent for lunar and planetary landers.

The invention claimed is:

1. An engine particle injection system onboard a spacecraft for in-flight landing pad construction, the system comprising:
   a rocket engine with a combustion chamber configured to burn propellant to create a plume during engine operation;
   a particle hopper connected to the rocket engine and configured to hold landing pad construction particles; and
   a particle injector configured to control the injection of the landing pad construction particles from the particle hopper into the rocket engine.

2. The system of claim 1, wherein the particle injector is downstream of a throat of the combustion chamber.

3. The system of claim 1, wherein the particle hopper and particle injector are configured to hold and inject particles of a diameter between 0.1 mm and 1 cm.

4. The system of claim 1, wherein the particle injector is located upstream or at the throat of the combustion chamber.

5. The system of claim 1, wherein the particle injector is integral with or located near the propellant injector.

6. The system of claim 1, wherein the particle injector is a coaxial injector that receives propellant before entering a combustion chamber of the rocket engine.

* * * * *